(12) United States Patent
Sugaya

(10) Patent No.: US 6,714,313 B1
(45) Date of Patent: Mar. 30, 2004

(54) IMAGE OUTPUT METHOD AND APPARATUS THEREFOR

(75) Inventor: Akio Sugaya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/250,395

(22) Filed: Feb. 16, 1999

(30) Foreign Application Priority Data

Feb. 15, 1999 (JP) .......................................... 11-035609
Feb. 16, 1999 (JP) .......................................... 10-048596

(51) Int. Cl.[7] .......................... G06F 15/00; G06K 1/00
(52) U.S. Cl. ...................... 358/1.15; 358/1.15; 358/1.1; 358/1.3; 358/1.9; 358/1.13; 358/1.12
(58) Field of Search ............................... 358/1.15, 1.1, 358/1.3, 1.9, 1.13, 1.12

(56) References Cited

U.S. PATENT DOCUMENTS

| | | | | |
|---|---|---|---|---|
| 5,106,067 A | * | 4/1992 | Higaki | 270/58.02 |
| 5,390,910 A | * | 2/1995 | Mandel et al. | 271/296 |
| 5,574,831 A | | 11/1996 | Grenda | 395/104 |
| 5,793,935 A | * | 8/1998 | Ko | 358/1.2 |
| 5,859,711 A | * | 1/1999 | Barry et al. | 358/1.15 |
| 5,933,584 A | * | 8/1999 | Maniwa | 358/1.15 |
| 5,940,582 A | * | 8/1999 | Akabori et al. | 358/1.13 |
| 5,982,994 A | * | 11/1999 | Mori et al. | 358/1.15 |
| 5,987,229 A | * | 11/1999 | Bender et al. | 358/1.15 |
| 6,325,368 B1 | * | 12/2001 | Ikeda et al. | 271/3.03 |

FOREIGN PATENT DOCUMENTS

EP          0 653 700 A1     5/1995

* cited by examiner

Primary Examiner—Kimberly A. Williams
Assistant Examiner—Ashanti Ghee
(74) Attorney, Agent, or Firm—Fitzpatrick, Cella, Harper & Scinto

(57) ABSTRACT

A virtual ejection port is selected by assigning virtual ejection ports to the virtual N ejection ports, then an ejection port of the apparatus is selected for output, and, in response to the entry of a print job designated for output to the virtual ejection port, the ejection port of the apparatus is determined by correlating the virtual ejection port with the ejection port of the apparatus.

15 Claims, 16 Drawing Sheets

FIG. 5

| VIRTUAL EJECTION PORT NO. | VIRTUAL EJECTION PORT INFORMATION 501 |
|---|---|
| VIRTUAL EJECTION BIN 1 | PAPER EJECTOR NO.=NULL<br>EJECTION PORT=NULL<br>PORT STATUS=NULL |
| VIRTUAL EJECTION BIN 2 | PAPER EJECTOR NO.=UNIT 1<br>EJECTION PORT=EJECTOR BIN 1<br>PORT STATUS=OUTPUT |
| VIRTUAL EJECTION BIN 3 | PAPER EJECTOR NO.=NULL<br>EJECTION PORT=NULL<br>PORT STATUS=NULL |
| VIRTUAL EJECTION BIN 4 | PAPER EJECTOR NO.=UNIT 1<br>EJECTION PORT=EJECTOR BIN 3<br>PORT STATUS=PAPER REMAINING |
| ⋮ | ⋮ |
| VIRTUAL EJECTION BIN n | PAPER EJECTOR NO.=NULL<br>EJECTION PORT=NULL<br>PORT STATUS=NULL |

FIG. 6

| EJECTION PORT INFORMATION | EJECTION PORT INFORMATION | | |
|---|---|---|---|
| PAPER EJECTOR NO. EJECTION PORT NO. | UNIT 1 BIN 1 | UNIT 1 BIN 2 | UNIT 1 BIN 3 |
| (A) PAPER FACE | FACE DOWN | FACE DOWN | FACE UP |
| (B) PAPER AMOUNT | 50% | VACANT | 30% |
| (C) STAPLE | PRESENT | PRESENT | PRESENT |
| (D) BASIC STATUS | OUTPUT | IDLING | IDLING (PAPER REMAINING) |
| (E) USER NAME | USER B | NONE | USER D |
| (F) PAPER SIZE | A5 TO A3 | A5 TO A3 | A5 TO A3 |
| (G) STAPLING | POSSIBLE | POSSIBLE | POSSIBLE |
| (H) PAPER TYPE | STANDARD RECYCLED | STANDARD RECYCLED | STANDARD RECYCLED OHP |
| | 601 | 602 603 | 604 |

FIG. 8

| VIRTUAL EJECTION PORT NO. | VIRTUAL EJECTION PORT INFORMATION 801 |
|---|---|
| VIRTUAL EJECTION BIN 1 | PAPER EJECTOR NO.=NULL<br>EJECTION PORT=NULL<br>PORT STATUS=NULL<br>REGISTERED USER NAME=USER A |
| VIRTUAL EJECTION BIN 2 | PAPER EJECTOR NO.=UNIT 1<br>EJECTION PORT=EJECTOR BIN 1<br>PORT STATUS=OUTPUT<br>REGISTERED USER NAME=USER B |
| VIRTUAL EJECTION BIN 3 | PAPER EJECTOR NO.=NULL<br>EJECTION PORT=NULL<br>PORT STATUS=NULL<br>REGISTERED USER NAME=USER C |
| VIRTUAL EJECTION BIN 4 | PAPER EJECTOR NO.=UNIT 1<br>EJECTION PORT=EJECTOR BIN 3<br>PORT STATUS=PAPER REMAINING<br>REGISTERED USER NAME=USER D |
| ⋮ | ⋮ |
| VIRTUAL EJECTION BIN n | PAPER EJECTOR NO.=NULL<br>EJECTION PORT=NULL<br>PORT STATUS=NULL<br>REGISTERED USER NAME=USER N |

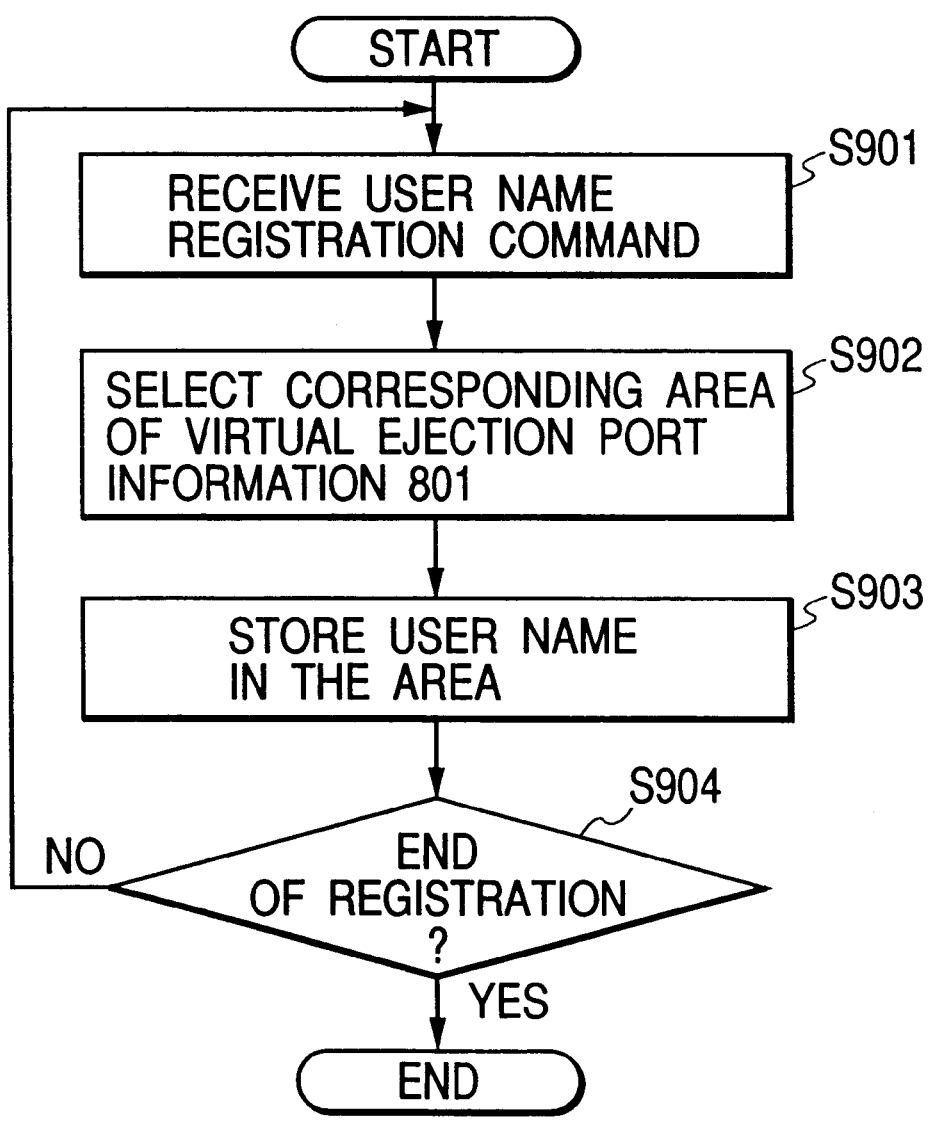

FIG. 15
USER INTERFACE SCREEN ~1501
| VIRTUAL BIN | USER NAME | ACTUAL PRINTER NAME | ACTUAL BIN | JOB NAME |
|---|---|---|---|---|
| BIN 1 | USER A | PRINTER A | ACTUAL BIN 1 | JOB 1 |
| BIN 2 | USER B | NOT USED | NOT USED | NOT USED |
| BIN 3 | USER C | PRINTER B | ACTUAL BIN 3 | JOB 2 |
| | | PRINTER B | ACTUAL BIN 4 | JOB 2 |
| BIN 4 | USER D | NOT USED | NOT USED | NOT USED |
| ⋮ | ⋮ | ⋮ | ⋮ | ⋮ |
| BIN n | USER N | NOT USED | NOT USED | NOT USED |
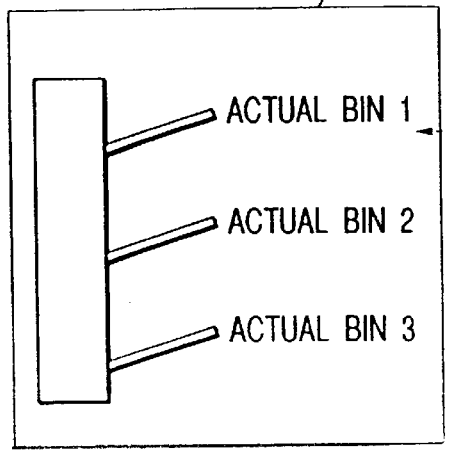
EJECTION UNIT OF PRINTER A ~1302
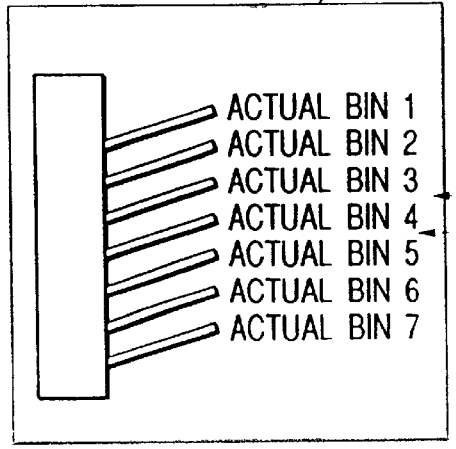
EJECTION UNIT OF PRINTER B ~1303

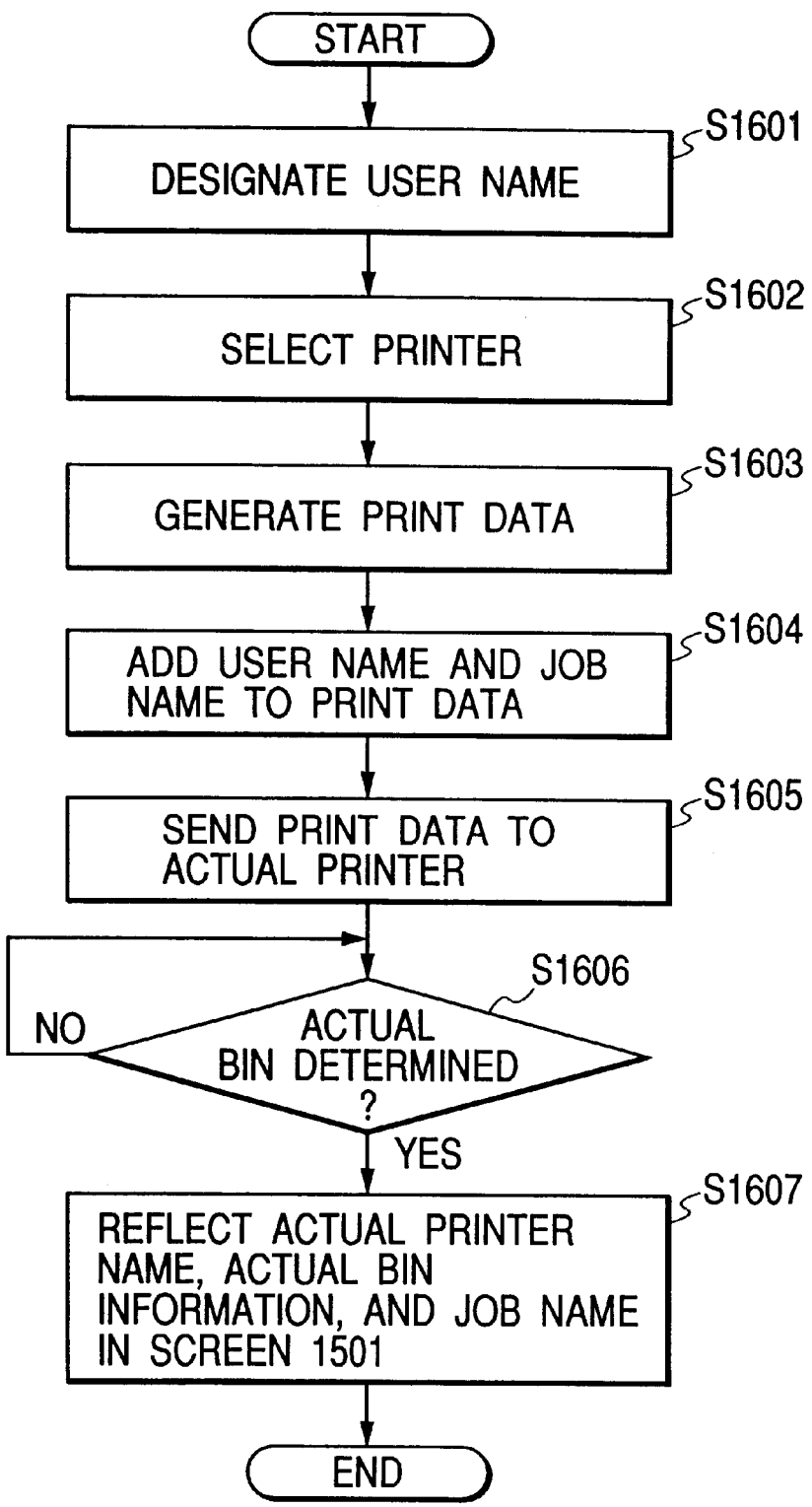

IMAGE OUTPUT METHOD AND APPARATUS THEREFOR

BACKGROUND OF THE INVENTION

1. Field of the Invention

The present invention relates to an image output method for outputting an image and an apparatus therefor.

2. Related Background Art

In recent years, computers are mutually connected through LAN (local area networks), and LAN connection has become possible not only for printers but also for other various peripherals such as multi-function image processing apparatus provided with copying and faxing functions.

The LAN (local area network) employed as the connection system for example in a floor enables common use of connected devices and mutual data transfer for a user group, and there is also known a WAN (wide area network) by mutually connecting plural LAN's in geographically distant locations through an integrated services digital network (ISDN) channel or a public telephone channel.

Each LAN is usually composed of a group of computers including a file server and a print server, and a network operating system loaded in each computer supports various protocols for transfer and common use of data and files, common use of the printer etc.

Also a print job transferred from an application functioning on each computer can generally be transferred, through a print server, to a printer connected to the network.

Also the communication protocols for remote management of equipment, including various devices constituting the network and computers connected on the network have become standardized, as exemplified by the SNMP (simple network management protocol). With the network equipment loaded with such protocol, the various devices can be managed from a distant location on the network, through the network management software. In case of a printer, there can be executed acquisition of the printer information, monitoring of the printer status, notice of the change in the printer status, control of the initialization etc.

The user applications functioning on the computer constituting the LAN include a document preparation software, a table calculation software etc. The data prepared with such applications are usually converted by a printer driver software as a function of the operating system into PDL (printer description language) data which are a printer control language, then temporarily stored as a print job in the print spooler and transferred to the printer.

The print job is a unit generated by the printer driver software as PDL (printer description language) from one or plural text files and constituting a printed document, and is usually separated by a job start command and a job end command. If the print data do not have a clear separation, the printer may independently define the start and end of the job.

As the image output apparatus connected in such network environment is used by plural users (client computers), the printed output data are mixedly stacked in the paper ejection port in the order of output of the print jobs.

For this reason the image output apparatus can have plural paper ejection ports and each user can select a particular paper ejection port for example by the printer driver, whereby the printed papers can be stacked without mixing with the print jobs instructed by other users.

It is also conceivable to provide the image output apparatus with an automatic ejection port selecting mode for searching the ejection ports available on the apparatus and automatically determining the paper ejection port, thereby automatically switching the paper ejection port.

Furthermore, the image output apparatus may be equipped with a function (hereinafter called mailbox function) in which a name is assigned one-to-one to each of the ejection ports provided in the apparatus and the user selects the name of the paper ejection port by the printer driver, whereby the paper ejection port to be used for the output can be selected for each user.

The above-described conventional configuration is however associated with a drawback that, even if the user selects a specified paper ejection port or the name thereof for example by the printer driver, other users can still select the same paper ejection port so that the print jobs of different users may eventually be mixed in the specified paper ejection port.

Also the automatic paper ejection port selecting mode for searching the available ejection ports and automatically determining the paper ejection port is incapable of preventing the mixed presence of the output jobs, since such mode is designed to output a large number of output jobs through plural paper ejection ports without errors.

Furthermore, in case of an error caused by a preceding user, such as an overstacking of papers in the ejection port, the output process is interrupted by such error and there is also interrupted the output process of the print jobs of other succeeding users who have designated the same ejection port.

On the other hand, in assigning names to the ejection ports in the mailbox function, it is possible to avoid the mixing by assigning the names of the user as the names of the ejection ports and causing each user to select the ejection port to which his name has been assigned.

In the mailbox function, however, such method is effective in case the image output apparatus is utilized by the users of which number does not exceed the number of the ejection ports provided in the apparatus, the registerable number of user names is limited even if the apparatus is to be utilized by the users of which number exceeds the number of the ejection ports. Consequently, in case a user whose name has not been registered as the name of the ejection port is going to utilize the apparatus, it is necessary to renew the user name by calling the operator or to provide an ejection port for the users who cannot utilize the mailbox function. For this reason, the mailbox function cannot be fully exploited in a large-scale network environment in which the number of the user exceeds that of the ejection ports.

Furthermore, in an image output apparatus capable of connecting plural paper ejecting optional devices, it is not possible to sequentially manage or designate the paper ejecting bins of each optional device.

Furthermore, in case plural printers are connected to the network, the user is required to select and designate an optimum paper ejection port according to the selected printer.

SUMMARY OF THE INVENTION

An object of the present invention is to solve the above-described drawbacks of the prior art. Another object of the present invention is to provide an image output method and an apparatus therefor, allowing each of plural users to automatically execute exclusive control without paying attention to the paper ejection ports used by other users, thereby preventing mixed presence of the print jobs at any specified paper ejection port.

Still another object of the present invention is to provide an image output method and an apparatus therefor, allowing to assign the paper ejection ports to N users without relaying on the number of the ejection ports provided on the apparatus, thereby preventing mixed presence of the print jobs at any specified paper ejection port.

Still another object of the present invention is to provide an image output method and an apparatus therefor, allowing plural users to automatically execute exclusive control by detecting a failure at the paper ejection port caused by another user, thereby enabling output of the print job without interruption.

Still another object of the present invention is to provide an image output method and an apparatus therefor, effecting selection of the paper ejection port for the print job at the timing of output to the apparatus, thereby preventing mixed presence of the print jobs in case the paper ejection ports of a limited number are used by N users, and also realizing the mailbox function for each of the N users.

The above-mentioned objects can be attained, according to the present invention, by an image output method for outputting an image from an image output apparatus provided with plural paper ejection ports, comprising a virtual ejection port assigning step of assigning a virtual ejection port to N virtual ejection ports (N being a natural number at least equal to 2), a virtual ejection port selecting step of selecting the virtual ejection port assigned by the virtual ejection port assigning step, and an ejection port selection control step of determining the ejection port of the apparatus for output by forming correspondence between the virtual ejection ports and the ejection ports of the apparatus in response to the entry of a print job designated for output to the virtual ejection port.

According to the present invention there is also provided an image output method further comprising a stacking detection step of detecting the stacking state of the ejection ports of the apparatus, wherein the above-mentioned ejection port selection control step is adapted to preferentially select an empty ejection port of the apparatus, detected by the stacking detection step, for the output.

The above-mentioned objects can also be attained, according to the present invention, by an image output method for outputting an image from an image output apparatus provided with plural paper ejection ports, comprising a name assigning step of assigning a name to N virtual ejection ports, a virtual ejection port selecting step of selecting a virtual ejection port by comparison of the name assigned by the name assigning step with an entered name, and an ejection port selection control step of forming correspondence between an entered name of the virtual ejection port and the ejection port of the apparatus thereby determining the ejection port of the apparatus for output.

According to the present invention there is also provided an image output method further comprising a name detecting step of detecting the name of an ejection port which is already used for output and is in the course of stacking, wherein the above-mentioned ejection port selection control step is adapted to compare the name detected by the name detecting step with a newly entered name thereby selecting an ejection port of the apparatus for output.

The above-mentioned objects can also be attained, according to the present invention, by an image output apparatus provided with plural paper ejection ports, comprising virtual ejection port assigning means for assigning virtual ejection ports to N virtual ejection ports, virtual ejection port selecting means for selecting the virtual ejection ports assigned by the virtual ejection port assigning means, and ejection port selection control means for determining the ejection port of the apparatus for output by forming correspondence between the virtual ejection ports and the ejection ports of the apparatus in response to the entry of a print job designated for output to the virtual ejection port.

According to the present invention there is also provided an image output apparatus further comprising stacking detection means for detecting the stacking state of the ejection ports of the apparatus, wherein the above-mentioned ejection port selection control means is adapted to preferentially select an empty ejection port of the apparatus, detected by the stacking detection means, for the output.

The above-mentioned objects can also be attained, according to the present invention, by an image output apparatus provided with plural paper ejection ports, comprising name assigning means for assigning names to N virtual ejection ports, virtual ejection port selecting means for selecting a virtual ejection port by comparison of the names assigned by the name assigning means with an entered name, and ejection port selection control means for forming correspondence between an entered name of the virtual ejection port and the ejection port of the apparatus thereby determining the ejection port of the apparatus for output.

According to the present invention there is also provided an image output apparatus further comprising name detecting means for detecting the name of an ejection port which is already used for output and is in the course of stacking, wherein the above-mentioned ejection port selection control means is adapted to compare the name detected by the name detecting means with a newly entered name thereby selecting an ejection port of the apparatus for output.

Still other objects of the present invention, and the features thereof, will become fully apparent from the following detailed description, claims and appended drawings.

BRIEF DESCRIPTION OF THE DRAWINGS

FIG. 5 is a view showing the data structure of virtual ejection port information stored in a RAM in the image output apparatus of the first embodiment of the present invention;

FIG. 6 is a view showing the data structure of apparatus ejection port information stored in a RAM in the image output apparatus of the first embodiment of the present invention;

FIG. 8 is a view showing the data structure of virtual ejection port information stored in a RAM in the image output apparatus of a second embodiment of the present invention;

FIG. 9 is a flow chart showing the sequence of registering a user name in the virtual ejection port information in the image output apparatus of a second embodiment of the present invention;

FIG. 15 is a view showing a user interface image frame of an image output system capable of integrally utilizing plural image output apparatus of a fourth embodiment of the present invention; and FIG. 16 is a flow chart showing the process sequence of a printer driver module on a host computer in the image output system capable of integrally utilizing plural image output apparatus of the fourth embodiment of the present invention.

DETAILED DESCRIPTION OF THE PREFERRED EMBODIMENTS

Now the present invention will be clarified in detail by preferred embodiments thereof, with reference to the attached drawings.

First Embodiment

At first a first embodiment of the present invention will be explained with reference to FIGS. 1 to 7. In the following description and drawings, a laser beam printer will be cited as an example of the image output apparatus, but it is to be understood that the present invention is not limited to such laser beam printer but can be the printer of any other printing process. Also in the following description and drawings, there will be explained a case in which two optional units are connected to the image output apparatus, but there may be connected a larger number of the optional units or the function of the optional unit may be incorporated in the image output apparatus itself.

Figure 1:
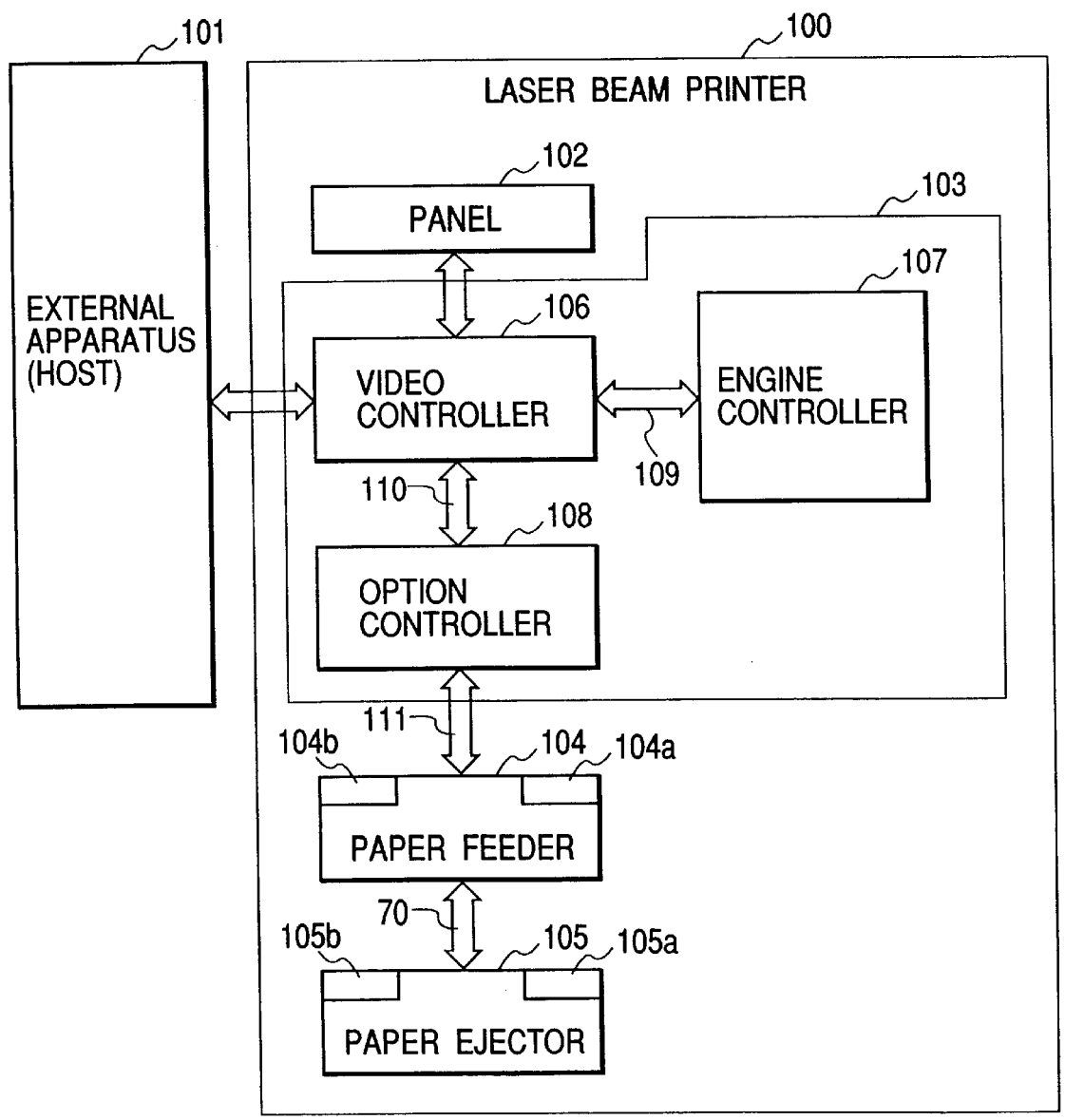
FIG. 1 is a block diagram showing the configuration of an image output apparatus constituting a first embodiment of the present invention.

FIG. 1 is a block diagram showing the configuration of a laser beam printer (LBP) constituting the image output apparatus of a first embodiment of the present invention. Referring to FIG. 1, a laser beam printer (hereinafter simply represented as printer) 100 is connectable to various optional units and is connected to an external apparatus 101 such as a host computer through a general-purpose interface (such as LAN interface or centronics), and records an image based on the print information (including image information such as character code data, graphic drawing commands, image data etc. based on a predetermined printer language and apparatus control information such as sheet switching and ejection port switching) transferred from the external apparatus 101 through such interface.

The details of the external apparatus 101 will be explained later with reference to FIG. 3.

The printer 100 is provided with an operation panel 102, a control unit 103, a paper feeding optional unit (paper feeder) 104 and a paper ejecting optional unit (paper ejector) 105.

The operation panel 102 is a user interface composed of various switches (buttons) for operations and a display unit consisting for example of an LCD (liquid crystal display) or an LED (light emitting diode) display. The user can instruct predetermined operations to the printer 100 by manipulating the operation panel 102. Various data set by the user are stored and managed in a non-volatile memory such as NVRAM (to be explained later).

The control unit 103 is composed of a video controller 106, an engine controller 107 and an option controller 108.

The video controller 106 is connected with the external apparatus 101 through the general-purpose interface, and is adapted to receive print data (various PDL data) transferred from the external apparatus 101 through the interface, to generate page information consisting for example of dot data based on the print data, to transmit the image data (binary or multi-value) to the engine controller 107 through the video interface 109 and to transmit commands such as for paper feeding and paper ejection to the option controller 108 through an integral interface 110.

The engine controller 107 forms a latent image on a photosensitive drum according to the known electrophotographic process and based on the image data transferred from the video controller 106, and executes printing by developing the latent image and transferring and fixing the obtained toner image on a supplied paper. In these operations, it instructs the timing of paper feeding and ejection to the option controller 108.

The option controller 108 is an integral controller provided with an unrepresented CPU (central processing unit), a ROM (read-only memory), a RAM (random access memory) etc. and integrally controlling at least an optional device based on the paper feeding/ejection command from the video controller 106 and the paper feeding/ejection command from the engine controller 107, and is adapted to effect communication with option controller units provided in the various optional devices thereby comprehensively controlling such optional devices.

A RAM in the option controller 108 is provided with an unrepresented common memory accessible by the video controller 106. The common memory is composed of a transport status management area, a basic status area, a command status management area etc. of about 40 pages, and the video controller 106 effects designation to the optional devices through the areas of such common memory.

The transport status management area is composed of an area by which the video controller 106 informs each optional device of the printing method (paper feeding port, ejection port, color, stapling, shifting etc.) and an area for informing the video controller 106 of the status of each optional device (printing status, completion of paper ejection etc.)

The basic status area is used for informing the video controller 106 of the abnormality (jam, absence of paper, absence of staple etc.) in the optional device, and the command status management area is used for exchanging command/status with the video controller 106.

The paper feeder 104 is provided for example in a paper deck optional device, is provided therein with a paper deck controller (large capacity paper cassette controller) 104a and effects paper feeding control based on the control information transmitted from the option controller 108. The paper deck controller 104a is provided with an unrepresented CPU (central processing unit), a ROM (read-only memory), a RAM (random access memory) etc. wherein the CPU controls the paper feeder 104 based on a program stored in the ROM. The ROM also stores expansion information of the paper feeder 104, for example the information on the paper size storable in the paper deck.

The paper ejector 105 is a finisher option for example provided with stapling function, is provided therein with a finisher controller 105a and executes stapling operation and paper ejecting operation based on the control information transmitted from the option controller 108. The finisher controller 105a is provided with an unrepresented CPU (central processing unit), a ROM (read-only memory), a RAM (random access memory) etc. wherein the CPU controls the paper feeder 104 based on a program stored in the ROM. The ROM also stores expansion information of the paper ejector 105, for example the number of paper bins, presence/absence of stapling function, presence/absence of shifting function for shifting the ejected paper in a predetermined direction, presence/absence of inverting function for inverting the face direction of the ejected paper.

The paper feeder 104 and the paper ejector 105 are respectively provided with operation units 104b, 105b equipped with display units and various operation keys, thereby displaying messages and operation methods for the user in the use of the optional devices and enabling control thereof.

Figure 2:
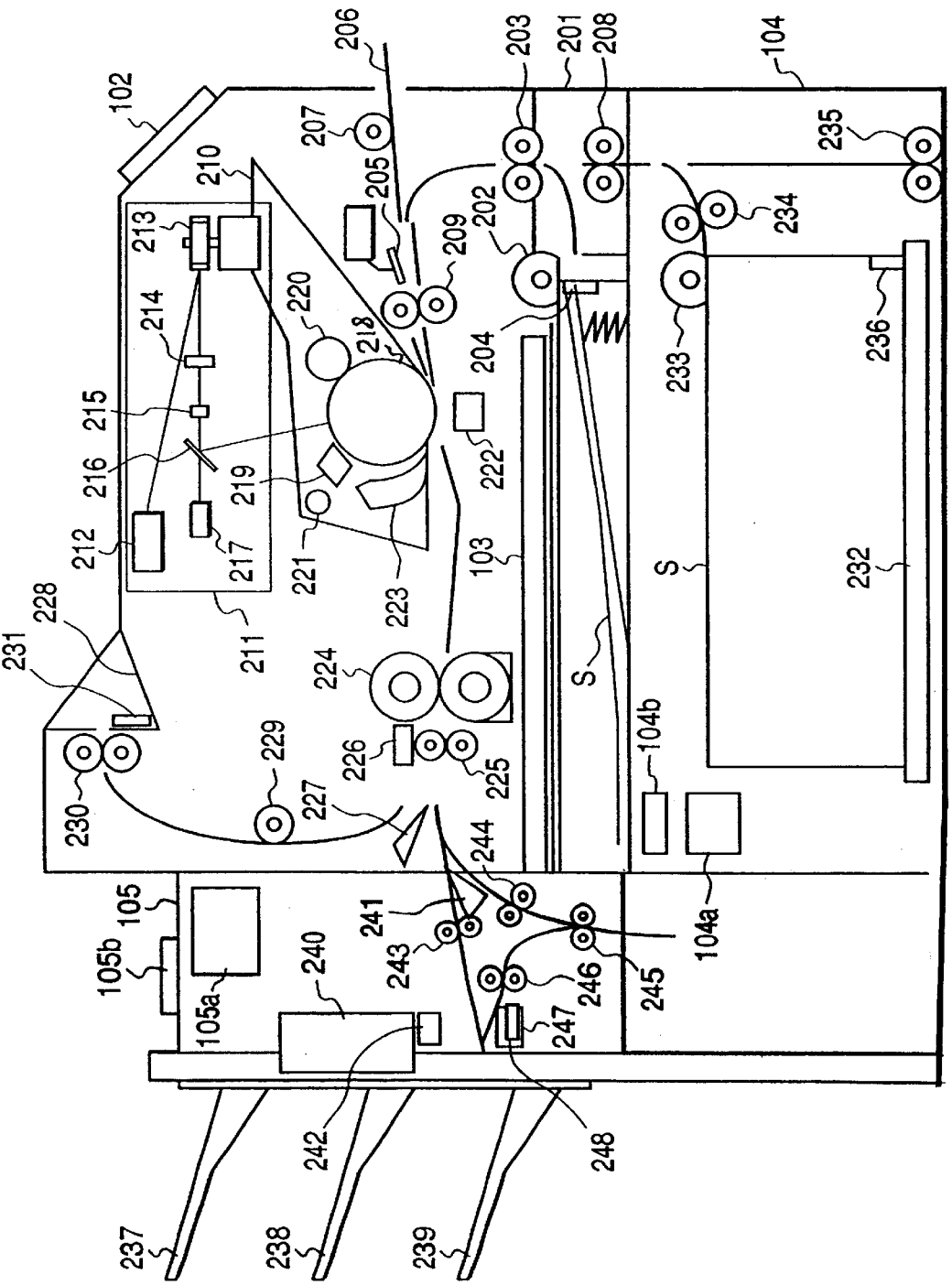
FIG. 2 is a schematic longitudinal cross-sectional view showing the configuration of an image output system, composed of the image output apparatus of the first embodiment of the present invention and an optional device therefor.

FIG. 2 is a longitudinal cross-sectional view showing the configuration of the printer 100 shown in FIG. 1. In FIG. 2, components same as those in FIG. 1 are represented by same numbers.

Referring to FIG. 2, a paper cassette 201 stores recording papers S and is provided with a paper size detector for electrically detecting the size of the recording paper S by an unrepresented partition plate. A cassette paper feeding clutch 202 is provided with a cam for separating the uppermost paper S only from the paper bundle stacked on the paper cassette 201 and transporting the separated recording paper S to a paper feed roller 203 by unrepresented drive means, and is intermittently rotated for each paper feeding, thereby feeding a recording paper S in each turn.

A recording paper sensor 204 detects the amount of the recording papers S contained in the paper cassette 201. A registration shutter 205 presses the paper to interrupt the feeding thereof. The paper feed roller 203 transports the front end of the recording paper S to the registration shutter 205. A manual insertion tray 206 supports the recording papers S. A manually inserted paper feeding roller 207 transports the recording paper S, supported on the manual insertion tray 206, to the registration shutter 205. An option paper feeding roller (paper relay transporting roller) 208 supplies the recording paper S, fed from the paper feeder 104, to the interior of the printer 100.

At the downstream side of the cassette paper feeding clutch 202, manually inserted paper feeding roller 207 and option paper feeding roller 208, there are provided a pair of registration rollers 209 for synchronized transportation of the recording paper S. At the downstream side of the registration rollers 209, there is provided an image recording unit 210 for forming a toner image on the recording paper S by a known electrophotographic process, utilizing a laser beam emitted from a laser scanner 211 to be explained later.

A laser scanner 211 is provided with a laser unit 212, a polygon mirror 213, an imaging lens group 214, a beam detector 215, a mirror 216 and a sensor 217. The laser unit 212 emits a laser beam based on the image signal transmitted from the video controller 106. The laser beam from the laser unit 212 is put into a scanning motion by the polygon mirror 213, guided through the imaging lens group 214 and the mirror 216 and irradiates a photosensitive drum 218 to be explained later, thereby forming a latent image thereon. The beam detector 215 detects the laser beams emitted from the laser unit 212 and outputs a main scan synchronization signal. The sensor 217 detects the laser beam emitted from the laser unit 212.

An image recording unit 210 is provided with a photosensitive drum 218, a primary charger 219, a developing unit 220, a pre-exposure lamp 221, a transfer charger 222, and a cleaner 223. The primary charger 219 uniformly charges the photosensitive drum 218. The developing unit 220 executes toner development of the latent image, formed on the photosensitive drum 218 by charging with the primary charger 219 and laser exposure with the laser scanner 211. The pre-exposure lamp 221 executes charge elimination of the photosensitive drum 218 by light. The transfer charger 222 transfers the toner image, formed on the photosensitive drum 218 by the development with the developing unit 220, onto the recording paper S fed by the registration rollers 209. The cleaner 223 removes the toner remaining on the photosensitive drum 218.

A fixing unit 224 fixes the toner image, formed on the recording paper S by the image recording unit 210, to the recording paper S. A transport roller 225 transports the recording paper S for ejection. An ejection sensor 226 detects the ejection status of the recording paper S. A flapper 227 switches the transport path of the recording paper S after recording toward an ejection tray 228 or an ejection optional device 105. Ejection rollers 229, 230 eject the recording paper S, transported by the switching action of the flapper 227, onto the ejection tray 228. An ejected paper amount sensor 231 detects the stacked amount of the recording papers S on the ejection tray 228.

The engine controller 107 in the control unit 103 controls the electrophotographic process by the image recording unit 210, the laser scanner 211 and the fixing unit 224, and the transportation of the recording paper S in the printer 100.

In the following there will be explained the various optional devices detachably connected to the printer 100.

The option controller 108 shown in FIG. 1 is provided in the printer 100 shown in FIG. 2, and is so constructed capable of communicating with the optional devices with a common protocol through an option interface 111 constituting a common bus. The option controller 108 is connected to the video controller 107 through the integral interface 110. The paper feeder 104 and the paper ejector 105 are connected via an interface 70.

The paper feeder 104 is provided with a paper deck 232, a paper deck paper feeding roller 233, a transport roller 234, a paper relaying transport roller 235 and a paper amount sensor 236. The paper deck 232 is vertically movable and supports a large amount of the recording papers S. The paper deck paper feeding roller 233 feeds the recording papers S stacked on the paper deck 232. The transport roller 234 transports the recording paper S, fed by the paper deck paper feeding roller 233, toward the option paper feeding roller 208. The paper relay transport roller 235 executes relayed transportation of the recording paper, supplied to another paper feeding optional device (capable of feeding recording papers of a same or different size) detachably connectable at the downstream side of the paper feeder 104. The paper amount sensor 236 detects the stacked amount of the recording papers S on the paper deck 232.

The paper feeder 104 is controlled by the paper deck controller 104a.

The paper ejector 105 is provided with a first ejection bin 237, a second ejection bin 238, a third ejection bin 239, a bin elevating motor 240, a flapper 241, a paper amount sensor 242, an ejection roller 243, transport rollers 244, 245, an ejection roller 246, a stapler 247 and a staple amount sensor 248.

The first to third ejection bins 237 to 239 stack the recording papers S after recording in sorted manner. The bin elevating motor 240 vertically moving the first to third ejection bins 237 to 239 thereby sorting the recording papers S thereinto. The flapper 241 executes, according to the instruction of the video controller 106, face switching of the recording paper S supplied by the flapper 227 of the printer 100 to the paper ejector 105.

The paper amount sensor 242 detects the amount of the recording papers S ejected into the first to third bins 237 to 239 moved by the bin elevating motor 240 in the vertical direction. The paper amount sensor 242 is composed of a height sensor, and, when the height of the recording papers S stacked on the first to third bins 237 to 239 reaches for example 88 mm (corresponding to about 700 sheets), the finisher controller 105a informs the video controller 106 of the fully stacked state through the option controller 108.

In case the video controller 106 designates the face up ejection of the recording paper S through the integral interface 110, the recording paper S switched by the flapper 241 is directly sent by the ejection roller 243 to the ejection port. In case the video controller 106 designates the face down ejection of the recording paper S through the integral interface 110, the recording paper S switched by the flapper 241 is transported by the transport rollers 244, 245 until the rear end of the paper S passes the transport roller 244 and then the transport roller 245 is reversed whereby the recording sheet S is introduced from the rear end thereof into the ejection rollers 246 and is sent to the ejection port.

In case the video controller 106 designates stapling through the integral interface 110, the recording papers S are stored in an unrepresented stapling tray, then aligned and stapled by the stapler 247, and are ejected to one of the first to third bins 237 to 239. Also in case the video controller 106 designates shifting through the integral interface 110, the recording papers S are stored in the unrepresented stapling tray as in the case of stapling, then aligned on the tray, shifted in the stacking position integrally with the stapling tray and are ejected to one of the first to third bins 237 to 239. The staple amount sensor 248 detects the remaining amount of the staples in the stapler 247.

The paper ejector 105 is controlled by the finisher controller 105a.

The option controller 108, the paper deck controller 104a and the finisher controller 105a are mutually connected with connectors and execute serial communication through an optional unit interface 111. As these controllers are serially connected through same connectors, it is possible to interchange the order of connection of the paper feeder 104 and the paper ejector 105.

Figure 3:
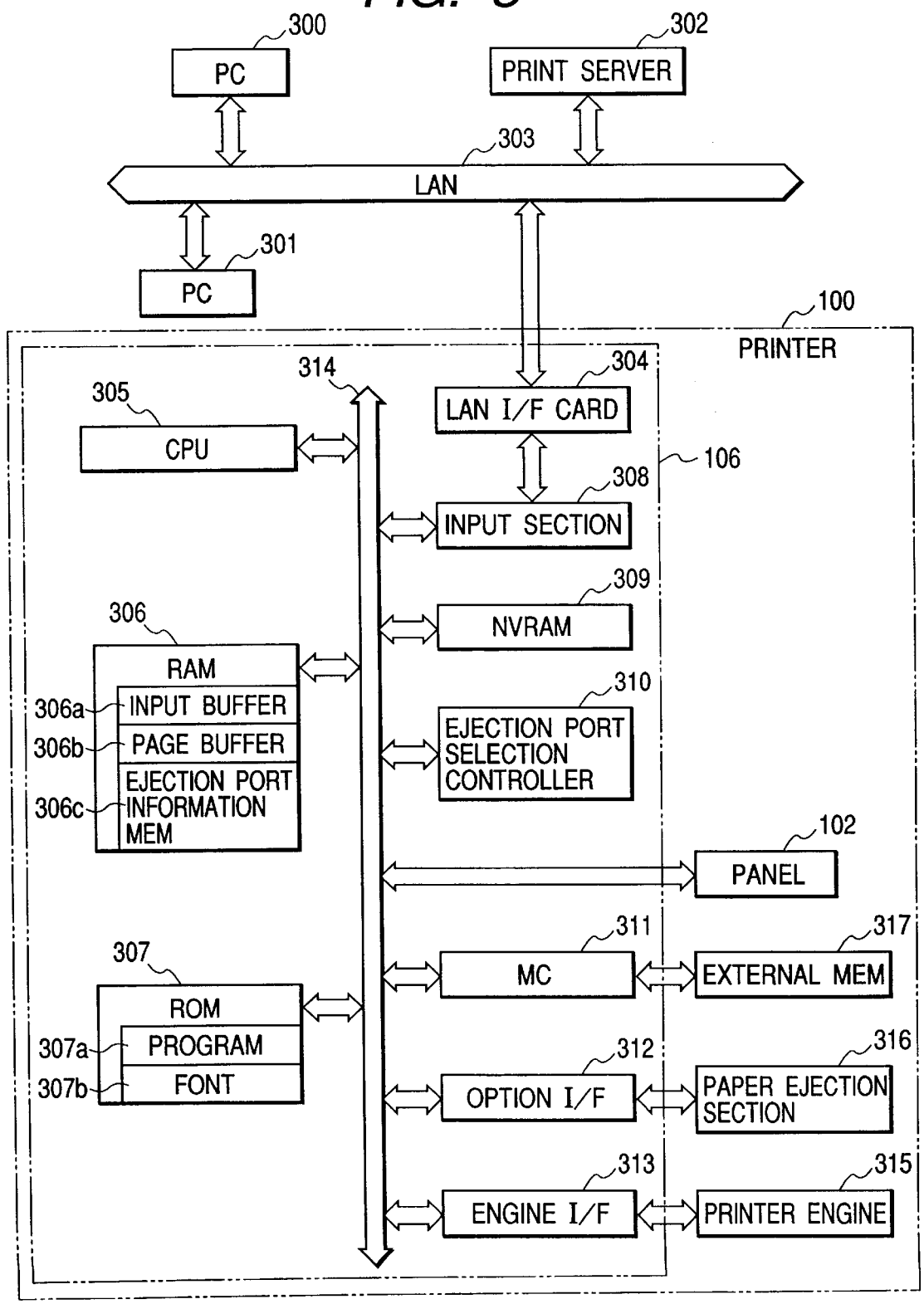
FIG. 3 is a block diagram showing the configuration of the image output system, composed of the image output apparatus of the first embodiment of the present invention and the optional device therefor.

FIG. 3 is a block diagram showing the configuration of a printer control system of the present embodiment, and the configuration will be explained in the case of the laser beam printer 100 shown in FIG. 2. The present invention is naturally applicable to a single equipment, or a system consisting of plural equipments or a system connected through a network such as a LAN, as long as the functions of the present invention are realized. It is also applicable to a case where the functions of the present invention are realized by the supply of a program to a system or an apparatus. In this case, a memory medium storing a program of the present invention constitutes the present invention, and such system or apparatus functions in a specified mode by reading such program from the memory medium into the system or apparatus.

Referring to FIG. 3, the printer control system is composed of a printer 100 which is an image output apparatus of the present invention, personal computers (PC) 300, 301 and a print server 302, connected by a LAN 303. The personal computers 300, 301 correspond to the external apparatus 101 shown in FIG. 1.

Referring to FIG. 3, a print job is generated as a printer control language by an application software functioning on the personal computer 300, and is stored in a print spooler in the print server 302. The personal computer 300 and the print server 302 can be realized as functions provided by the network operating system. The print server 302 executes communication control through a LAN interface card 304 in the printer 100 and the LAN 303 thereby transferring the print job to the video controller 106.

Also in the personal computer 301 used by another user, a print job is generated as a printer control language by an application software functioning on the personal computer 301, and is stored in a print spooler in the print server 302. The personal computer 300 and the print server 302 can be realized as functions provided by the network operating system. The print server 302 executes communication control through a LAN interface card 304 in the printer 100 and the LAN 303 thereby transferring the print job to the video controller 106.

The print job indicates a block of for example input pages, entered in a data unit separated by a job start command and a job end command.

The video controller 106 is provided with a CPU (central processing unit) 305, a RAM (random access memory) 306, a ROM (read-only memory) 307, an input unit 308, an NVRAM (non-volatile random access memory) 309, an ejection port selection controller 310, an MC (memory controller) 311, an option interface (I/F) 312, and a printer interface 313, which are connected by a system bus 314.

The CPU 305 integrally controls access to various devices connected to the system bus 314, based on a control program stored in a program ROM 307a of the ROM 307, and outputs, through the printer I/F 313, an output image signal to a printer engine 315 controlled by the engine controller 107.

The option I/F 312 executes communication with a paper ejection section 316 according to the instruction from the CPU 305. The paper ejection section 316 corresponds to the option controller 108 and the paper ejector 105 shown in FIG. 1. The communication signal between the printer I/F 313 and the option I/F 108 may also be transmitted directly.

The program ROM 307a of the ROM 307 for example stores a control program for the CPU 305, corresponding to flow charts shown in FIGS. 4 and 7, to be explained later.

A font ROM 307b of the ROM 307 stores font data (outline font data or dot font data) to be used in the generation of the output image. The CPU 305 is so constructed as to be capable of communication with the print server 302 by the input unit 308, through the LAN interface card 304.

The RAM 306 functions as a main memory, a work area, an input buffer etc. of the CPU 305, and is so constructed that the memory capacity can be expanded by an option RAM connected to an unrepresented expansion port. The RAM 306 is provided with an input buffer memory 306a, a page buffer memory 306b and an ejection port information memory 306c. The input buffer memory 306a stores input print data. The page buffer memory 306b stores the print data, entered in the input unit 308, in the form of intermediate codes or an intermediate bit map image. The ejection port information memory 306c stores the process status of the paper ejection section 316, obtained for example by a sensor in the paper ejector 105 through the option I/F 312, and presence/absence of the stacked papers and stacked amount in each of the ejection bins 237 to 239.

An external memory 317 is a detachable secondary memory such as a hard disk of which access is controlled by the memory controller 311, and is used for registering an exceptional character file on the host computer 101 or registration data transferred for example from a form file. It is also used as an input spool buffer for storing the input data, and also as a page buffer memory for storing data to be printed and form data in the form of intermediate codes or an intermediate bit map image.

The external memory 317 is not limited to a single unit, but there may be connected plural units of the external memory for storing optional fonts in addition to the internally stored font, and an emulation program for interpreting a printer control language of a different language system (PDL). Also, the external memory 317 is not limited to a hard disk but can be composed, for example, of a flush memory card.

The control program for the CPU 305 is composed of a real-time OS (operating system) for time-shared control in the unit of a load module (called task) based on an unrepresented system clock signal, and plural load modules (tasks) functioning in the use of each function.

Figure 4:
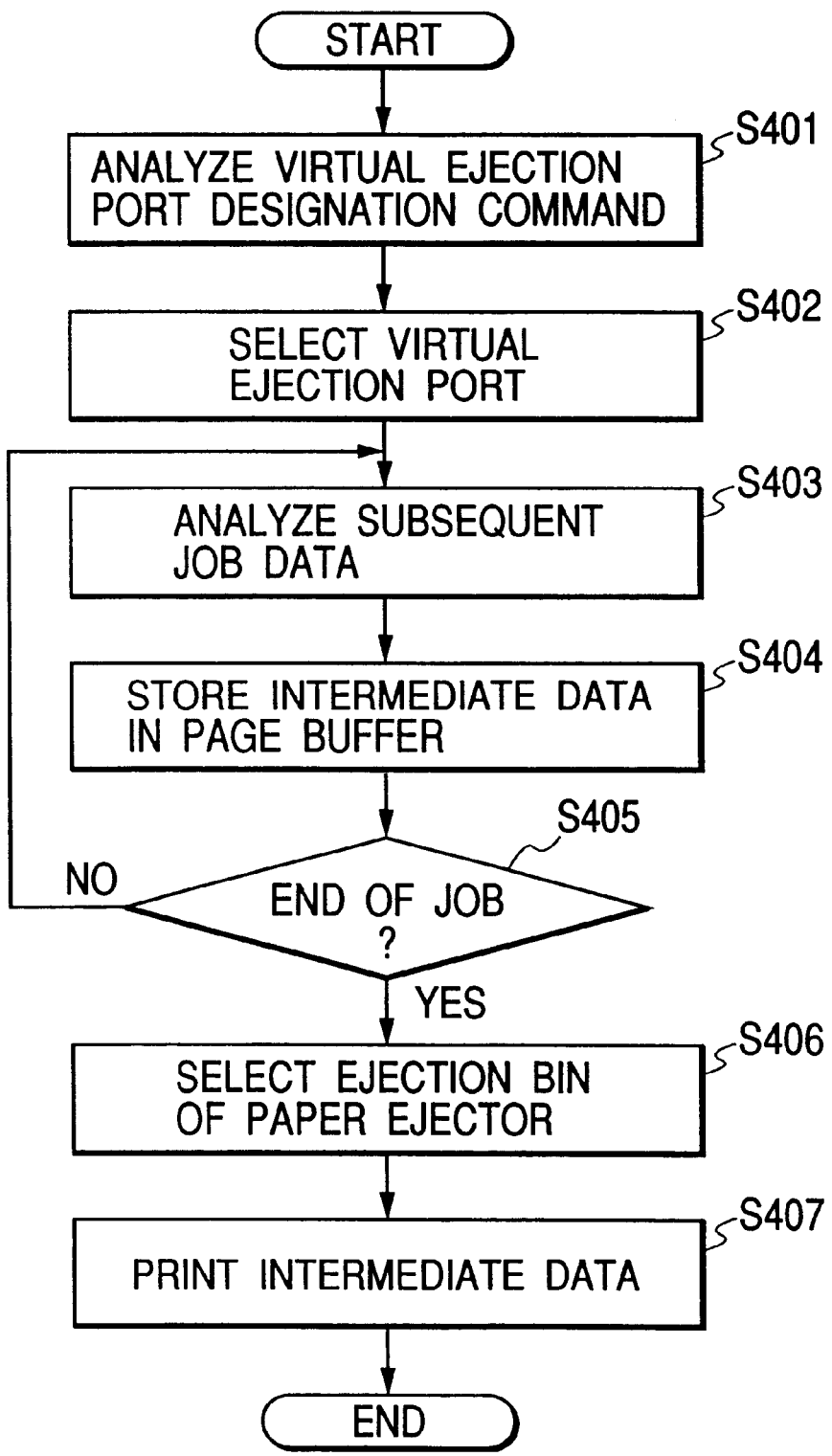
FIG. 4 is a flow chart showing the process sequence of the above-mentioned image output system.

FIG. 4 is a flow chart showing the process sequence of the image output apparatus 100 of the present embodiment.

When printing is instructed by the user, utilizing the application program on the personal computer 300, the generated print job is outputted to the print server 302. This print job is then transmitted, from the print server 302, to the input unit 308 based on the communication control with the LAN interface card 304.

The entered print job contains, in addition to the PDL data for image formation, a virtual ejection port designation command, a stapling command etc. to the paper ejector 105. The details of such print job will be explained in the following second embodiment.

Referring to FIG. 4, a step S401 analyzes a virtual ejection port designation command contained in the print data entered in the input buffer 306a of the RAM 306, and then a step S402 selects the designated virtual ejection bin (virtual ejection port) and stores the designation information as print job information (not shown) in the page buffer 306b of the RAM 306.

In the present embodiment, the virtual ejection port is designated by the number thereof. The virtual ejection port number may be registered in-advance by the operation panel of the image processing apparatus 100 or a utility program on the host computer. Also, when a number of designated by the virtual ejection port designating command, such number may be registered if such number is not already registered. In the latter case, after the printed papers are ejected to an ejection port of the apparatus assigned to the virtual ejection port number, such number registration may be canceled upon detection of the removal of the printed papers.

A next step S403 analyzes presence/absence of stapling instruction, designation of output face, designation on the print job and the information constituting the print job, by a job analyzing module in the ROM 307, and stores thus obtained print job information (not shown), constituting integral correspondence of the intermediate pages, in the page buffer memory 306b of the RAM 306.

Then a step S404 executes reading in succession of the succeeding PDL data (control codes indicating the print positions and character codes), analysis of the PDL data by an image generation module in the ROM 307, classification into a band unit corresponding to the print position designated by the control code, and storage as intermediate data in the page buffer memory 306b of the RAM 306. The intermediate data are stored in the unit of each page, and are regarded as the data of a same page until a page end control code such as a new page command is detected in the print data.

Then a step S405 discriminates whether a previous print job has been completed, and, if not, the sequence returns to the step S403 to execute analysis of a succeeding job data.

When a print job is stored as intermediate page data in the RAM 306 for output to the virtual ejection port by the image generation module of the ROM 307, the ejection port selection controller 310 is activated.

On the other hand, in case the step S405 identifies that the print job in execution has been completed, a next step S406 selects, through the option interface 312, the ejection bins 237 to 239 of the paper ejector 105 to be actually used for output by the ejection port selection controller 310. Then a step S407 executes bit map development of the intermediate page data, stored in the page buffer memory 306b of the RAM 306, into a bit map memory of the RAM 306, then transmits the generated bit map image to the engine controller 107 through the printer interface 313 and causes the print engine 315 to execute the printing operation, whereupon the present sequence is terminated.

FIG. 5 shows virtual ejection port information stored in the ejection port information memory of the RAM 306, wherein virtual ejection port information 501 has N virtual ejection bins. The user designates an arbitrary one of the virtual ejection bin numbers (1) to (n) by selecting a virtual ejection bin by an application program on the host computer and causing the printer driver to issue a virtual ejection port command.

The virtual ejection port information 501 stores, for each virtual ejection bin, a paper ejector number, an ejection port number of the paper ejector and information indicating the status of the ejection bin. The paper ejector number specifies a paper ejector selected by the ejection port selection controller 310 in case plural paper ejectors are employed. "NULL" is indicated if the virtual ejection port is not utilized and the print job is not entered. The ejection port is information indicating the ejection port selected among those 237 to 239 by the ejection port selection controller 310. "NULL" is indicated if the virtual ejection port is not utilized and the print job is not entered.

The ejection bin status is information indicating the ejection bin selected by the ejection bin selection controller 310. "OUTPUT" indicates that an output operation is in execution, while "PAPER REMAINING" indicates that the output operation is completed but the papers are remaining, and "ERROR" indicates for example excessive stacking of the output papers. "NULL" is indicated if the virtual ejection port is not utilized and the print job is not entered.

Such information, detected by a sensor provided for example in the paper amount sensor 242 in the paper ejector 105, is informed from the paper ejection section 316 to the option interface 312 and is rewritten on real-time basis by the option interface 312.

Such information is also informed by SNMP (simple network monitoring protocol) to the host computer (user) which has outputted the print job, and is also used by the utility software of the network receiving such information, for notifying whether the output has been made of the virtual ejection port selected by the user. In particular, the user and the computer are informed of the real ejection bin, in which the result of the outputted print job has been ejected.

FIG. 6 shows apparatus ejection port information stored in the ejection port information memory of the RAM 306, wherein apparatus ejection port information 601 has areas of a number corresponding to that of the ejection ports of the apparatus. In the present embodiment, there are provided memory areas of three bins, namely ejection bin areas (1) 602, (2) 603 and (3) 604.

In the apparatus ejection port information 601, a paper ejector number and an ejection port number are ID (identifiers) for correlating the memory areas, paper ejectors and ejection bins.

(A) Paper face is status information indicating the current status of the face down/up output of the ejection bin (uniquely determined in the present embodiment by the configuration of the paper ejector).

(B) Paper amount is status information indicating presence/absence or stacked amount of the papers in the ejection bin. This information is detected by the paper amount sensor 242 in the paper ejector 105, informed from the paper ejection section 316 to the option interface 312, and is renewed by the option interface 312 in case a status change.

(C) Staple amount is status information indicating presence/absence of staples of the stapler used for all the ejection bins. This information is detected by the stapler sensor 248 in the paper ejector 105, informed from the paper ejection section 316 to the option interface 312, and is renewed by the option interface 312 in case a status change.

(D) Basic status is status information indicating the ejection status of the ejection bin. This information is obtained by referring to a transport status management area and a basic status area in an unrepresented common memory in the RAM of the option controller 108, accessible by the video controller 106.

The basic status includes an idling state, an output state, an error state and a warning state.

The above-described information (A) to (D) are current status information of which status changes according to the process situation of the input print job.

(E) User name indicates the name of the user whose job is currently outputted to the ejection bin or the name of the owner of the papers already outputted and retained in the ejection bin. This information includes the user name transmitted from the host computer and the notice address, and is used for display on the operation panel 102 or for status notice to the host computer (user) by SNMP, in case of completion of the output or an error in the output.

(F) Paper size information indicates paper size acceptable by the ejection bin.

(G) Stapling information indicates whether the ejection bin is capable of stapling.

(H) Paper type information indicates the paper type usable for output to the ejection bin.

The above-described information (E) to (H) are informed to the host computer as usable information, and may also be utilized for correlating the virtual ejection ports and the apparatus ejection ports in the ejection port selection controller 310.

Figure 7:
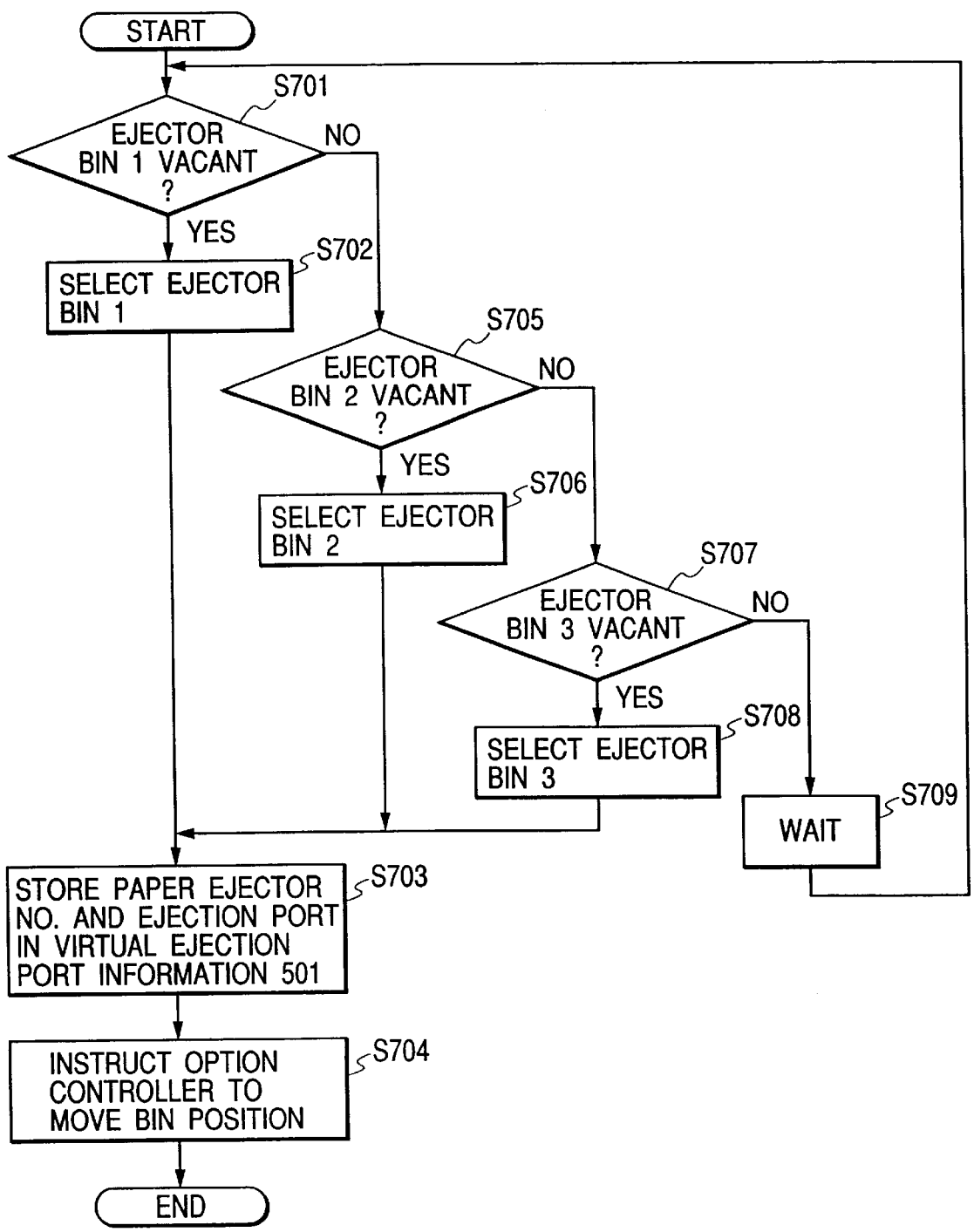
FIG. 7 is a flow chart showing the selection sequence of an ejection port selection control unit in the image output apparatus of the first embodiment of the present invention.

FIG. 7 is a flow chart showing the process sequence of the ejection port selection controller 310 for correlating the virtual ejection port and the apparatus ejection port in the image output apparatus of the present embodiment.

Referring to FIG. 7, when a print job is stored by the image generation module of the ROM 307 as intermediate page data of at least a page in the RAM 306 and the number designated by the virtual ejection port designation command is not assigned to the apparatus ejection port (ejection port NULL in FIG. 5), a step S701 discriminates whether the ejection bin (1) is empty, by referring to (B) paper amount of the ejection port information 602 for the apparatus ejection bin (1) in the apparatus ejection port memory in the RAM 306. If the bin is empty, a step S702 selects the ejection bin (1). Then a step S703 stores the paper ejector number and the apparatus ejection port in an area of the virtual ejection port number assigned to the virtual ejection port information 501 in the RAM 306 and selected in the step S702. Then a step S704 instructs the option controller 108 to move the position of the ejection bins, and the presence sequence is terminated.

In response, the option controller 108 moves the ejection bins according to the paper output, while making communication with the engine controller 107 as explained in the foregoing.

On the other hand, if the step S701 identifies that the ejection bin (1) is not empty, a step S705 discriminates whether the ejection bin (2) is empty, by referring to (B) paper amount of the ejection port information 603 for the apparatus discharge bin (2) in the apparatus ejection port memory in the RAM 306. If empty, a step S706 selects the ejection bin (2), and the sequence proceeds to the step S703 for storing the paper ejector number and the apparatus ejection port in an area of the virtual ejection bin number assigned to the virtual ejection port information 501 in the RAM 306 and selected in the step S706.

On the other hand, if the step S705 identifies that the ejection bin (2) is not empty, a step S707 discriminates whether the ejection bin (3) is empty, by referring to (B) paper amount of the ejection port information 603 for the apparatus discharge bin (3) in the apparatus ejection port memory in the RAM 306. If empty, a step S708 selects the ejection bin (3), and the sequence proceeds to the step S703 for storing the paper ejector number and the apparatus ejection port in an area of the virtual ejection bin number assigned to the virtual ejection port information 501 in the RAM 306 and selected in the step S708.

On the other hand, if the step S707 identifies that the ejection bin (3) is not empty, the sequence proceeds to the step S709 for awaiting the completion of output to the ejection bin or awaiting that the ejection bin is emptied by removal of the currently retained papers, and the sequence then returns to the step S701.

In the above-described embodiment, the step S709 in FIG. 7 awaits that the ejection bin is emptied in case no ejection port is available for selection, but it is also possible, in such case, to send a notice to the address of the user whose outputs is completed but not yet removed, in order to request removal of the output papers. In such case, the notice is displayed by the utility software on the host computer, utilizing the SNMP provided in the LAN interface 304.

It is also possible to eliminate the ejection port in the error state, by referring to the (D) basic status of the ejection port information 602 to 604. The ejection port selection controller 310 selects the ejection port by investigating the empty state of the ejection ports, but the assignment is advantageously made by comparing the ability of the ejection port such as (F) paper size, (G) stapling and (H) paper type in the ejection port information 602 to 604 with that described in the input print job.

In the present embodiment, in case a job is entered with designation of a virtual ejection port in which output papers are not yet removed but are remaining therein, the output of such job is ejected to such bin containing the remaining papers. In such case the paper ejection position may be shifted, in order to distinguish the jobs.

Second Embodiment

In the following a second embodiment of the present invention will be explained with reference to FIGS. 8 to 12.

The image output apparatus of the present embodiment and the image output system employing such image output apparatus are same as those in the foregoing first embodiment shown in FIGS. 1 to 3 and will therefore be explained with reference to these drawings.

In the present embodiment, an arbitrary name can be used or designating the virtual ejection port.

The name of the virtual ejection port may be registered in advance by the operation panel of the image output apparatus 100 or the utility program of the host computer (cf. FIG. 9) or may be an unregistered name designated by the virtual ejection port designating command. In the latter case, such registration of the virtual ejection port name may be canceled by detecting that the output papers are removed from the ejection port assigned to the virtual ejection port of the registered name.

In the present embodiment, the application program or the printer driver of the host computer designates the user name as the name of the virtual ejection port in case the virtual ejection port is not particularly designated by the user, but the present invention is not limited to such embodiment.

FIG. 8 shows virtual ejection port information stored in the ejection port information memory in the RAM 306, in the image output system provided with the image output apparatus of the present embodiment, wherein virtual ejection port information 801 has N virtual ejection bins that can be assigned to all the users utilizing the present apparatus in case the virtual ejection port names are registered in advance (the aforementioned former case) and are assigned with user names corresponding one-to-one to the virtual ejection ports. The user designates a virtual ejection bin to which his own user name (or another user name (in case of mailing)) is assigned by the application program on the host computer, or, in the absence of the designating operation by the user, the printer driver acquires the user name from the system in the host computer and designates such user name as the name of the virtual ejection port.

The virtual ejection port information 801 stores, for each virtual ejection bin, a paper ejector number, an ejection port number of the paper ejector, and information indicating the status of the ejection bin and the registered user name.

The paper ejector number, the ejection port and the status of the ejection bin are same as those explained in the foregoing first embodiment.

The ejection port selection controller 310 selects the ejection bin of the apparatus, based on the registered user name (aforementioned registered user name) and the user name added to the input print job (designated by the virtual ejection port designating command).

The registered user name is assumed to be retained in the RAM 306, but it may also be retained in the NVRAM 309 for storage even in case of power breakdown thereby improving convenience.

Such information, detected by a sensor provided for example in the paper amount sensor 242 in the paper ejector 105, is informed from the paper ejection section 316 to the option interface 312 and is rewritten on real-time basis by the option interface 312.

Such information is also informed by SNMP (simple network monitoring protocol) to the host computer (user) which has outputted the print job, and is also used by the utility software of the network receiving such information, for notifying whether the output has been made to the virtual ejection port selected by the user. In particular, the user and the computer are informed of the real ejection bin, in which the result of the outputted print job has been ejected.

FIG. 9 is a flow chart showing the storing sequence of the registered user names assigned to the ejection ports in the ejection port information 801 shown in FIG. 8.

This process of registering the user name for each virtual ejection port is usually executed prior to the input of the print job, and management is executed for example by a user name registering application on the host computer, so as to maintain one-to-one correspondence between the users (user names) and the virtual ejection ports.

Referring to FIG. 9, when a step S901 executes input of a user name registration command issued by the user name registering application, a step S902 selects an area of the ejection port information 801 corresponding to the virtual ejection port number designated by the above-mentioned command. Then a step S903 stores the user name in the selected virtual ejection port number (ejection bin). A next step S904 discriminates whether the name registration has been completed for all the users, and, if not, the sequence returns to the step S901, but, if completed, the present sequence is terminated.

Consequently the number of the virtual ejection bins can be same as that of the registered users, or larger than that if a same user utilizes plural bins.

Figure 10:
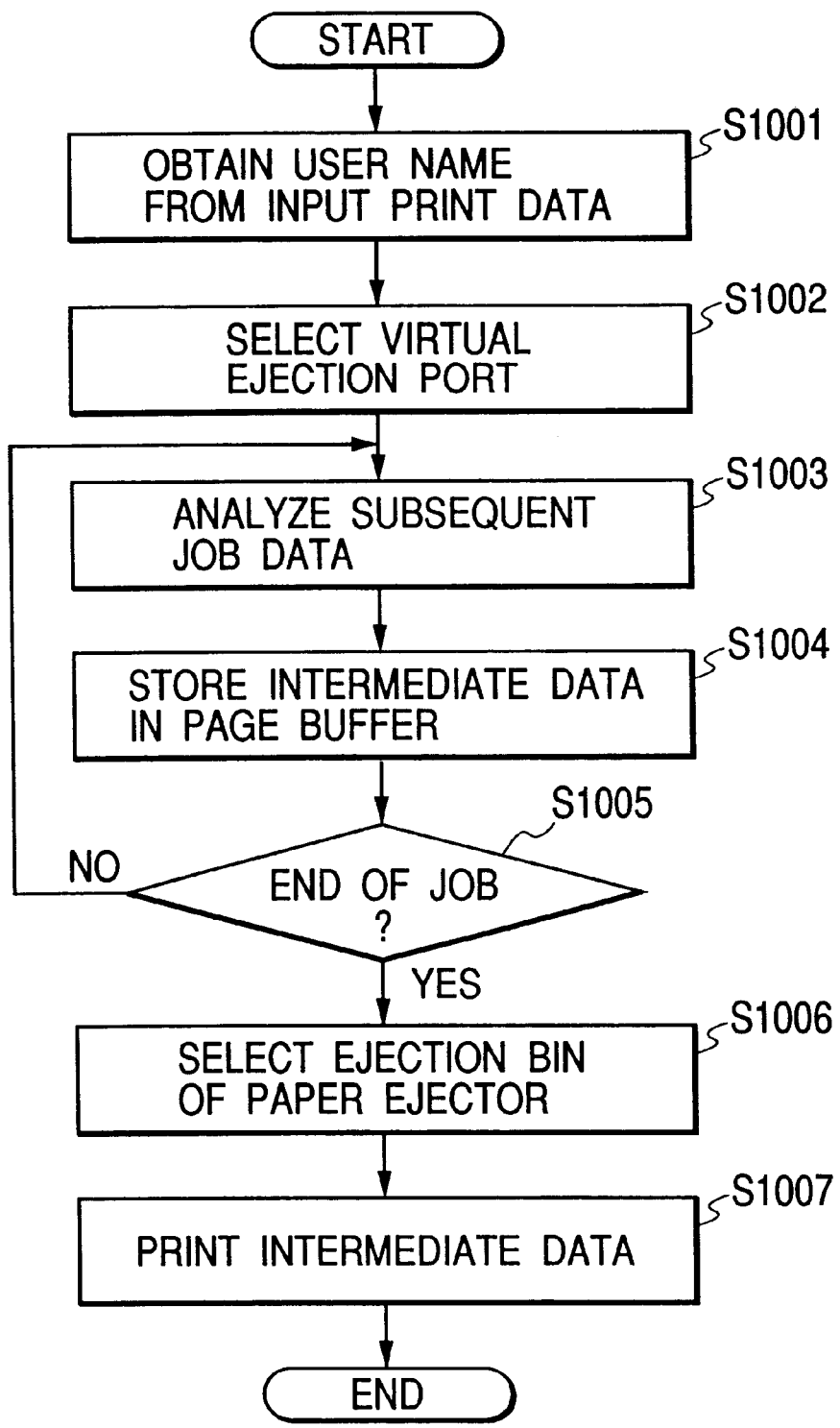
FIG. 10 is a flow chart showing the process sequence in an image output system including image output apparatus of the second embodiment of the present invention.

FIG. 10 is a flow chart showing the process sequence of the image output system including the image output apparatus of the present embodiment.

When printing is instructed by the user, utilizing the application program on the personal computer 300, the generated print job is outputted to the print server 302. This print job is then transmitted, from the print server 302, to the input unit 308 based on the communication control with the LAN interface card 304.

The entered print job contains, in addition to the PDL data for image formation, a virtual ejection port designation command and a stapling command to the paper ejector 105, the owner (user) name of the print job and the name of the print server executing the management/transfer of the print job.

Referring to FIG. 10, at first a step S1001 acquires information such as the user name, print server name etc. of the print job from the print data, entered into the input buffer memory 306a of the RAM 306. Then a step S1002 selects a virtual ejection port matching the registered user name, stored in each virtual ejection port of the virtual ejection port information 801 registered in advance, and the information of such selection is stored, as print job information (not shown), in the page buffer memory 306b in the RAM 306.

Then a next step S1003 analyzes presence/absence of stapling instruction, designation of output face, designation on the print job and the information constituting the print job, by a job analyzing module in the ROM 307, and stores thus obtained print job information (not shown), constituting integral correspondence of the intermediate page data, in the page buffer memory 306b of the RAM 306.

Then a step S1004 executes reading in succession of the succeeding PDL data (control codes indicating the print positions and character codes), analysis of the PDL data by an image generation module in the ROM 307, classification into a band unit corresponding to the print position designated by the control code, and storage as intermediate data in the page buffer memory 306b of the RAM 306. The intermediate data are stored in the unit of each page, and are regarded as the data of a same page until a page end control code such as a new page command is detected in the print data.

Then a step S1005 discriminates whether a print job has been completed, and, if not, the sequence returns to the step S1003 to execute analysis of succeeding data.

When a print job is stored as intermediate page data in the RAM 306 for output to the virtual ejection port by the image generation module of the ROM 307, the ejection port selection controller 310 is activated.

A next step S1006 selects, through the option interface 312, the ejection bin of the paper ejector 105 to be actually used for output by the ejection port selection controller 310. Then a step S1007 executes bit map development of the intermediate page data, stored in the page buffer memory 306b of the RAM 306, into a bit map memory of the RAM 306, then transmits the generated bit map image to the engine controller 107 through the printer engine 315 and causes the printer engine 315 to execute the printing operation, whereupon the present sequence is terminated.

Figure 11:
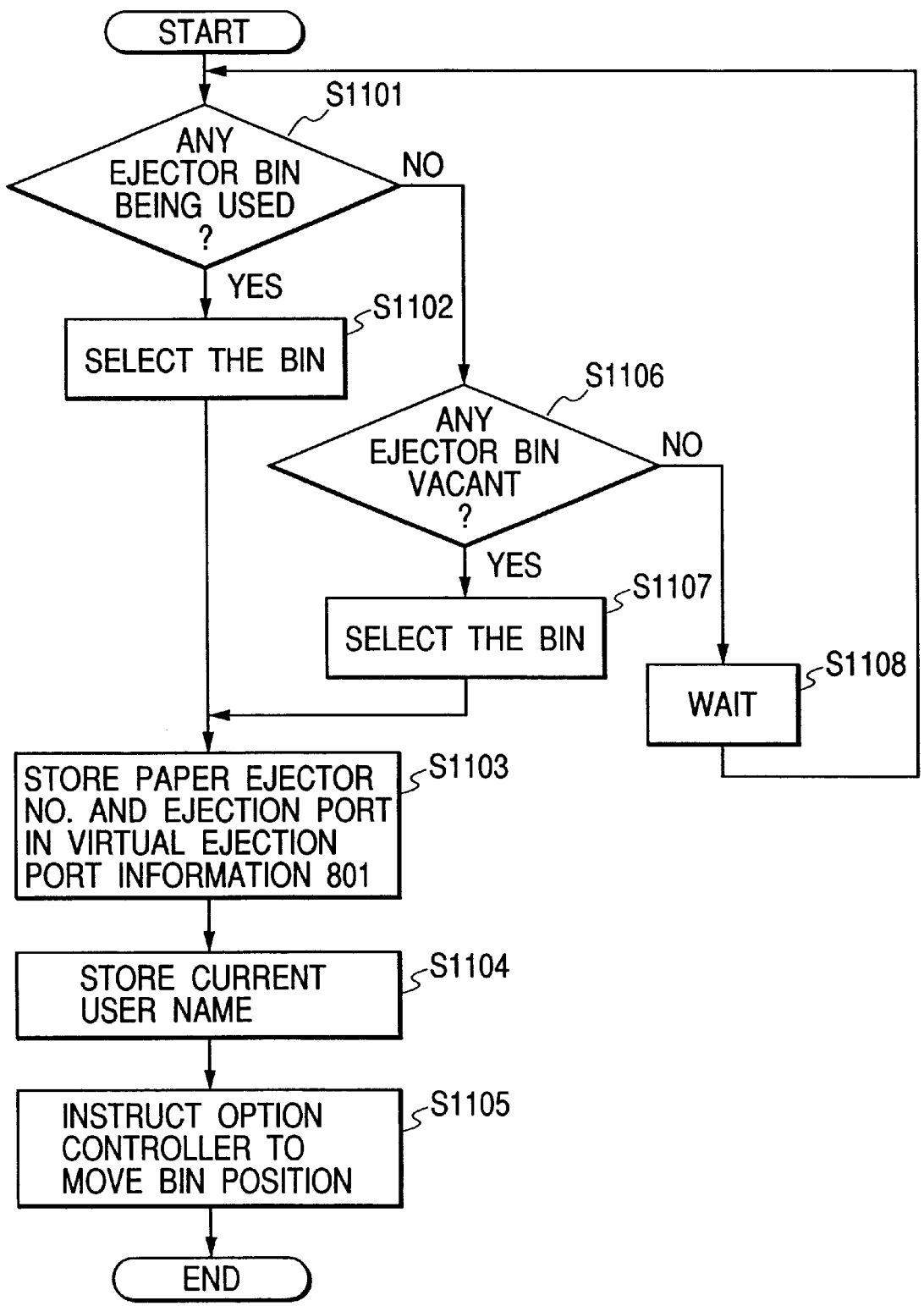
FIG. 11 is a flow chart showing the selection sequence of an ejection port selection control unit in the image output apparatus of the second embodiment of the present invention.

FIG. 11 is a flow chart showing the process sequence of the ejection port selection controller 310 for correlating the virtual ejection port and the apparatus ejection port in the image output apparatus of the present embodiment.

Referring to FIG. 11, when a print job is stored by the image generation module of the ROM 307 as intermediate page data of at least a page in the RAM 306, a step S1101 discriminates whether there is an ejection port which is in the course of output or is already used and still contains papers, by referring to (E) user name of the ejection port information 602 to 604 for the apparatus ejection bins in the apparatus ejection port memory in the RAM 306. If there is an ejection port in current use (among the ejection bins (1) 237 to (3) 239), a step S1102 selects the ejection bin in current use.

Then a step S1103 stores the paper ejector number and the apparatus ejection port information in an area of the virtual ejection port number assigned to the virtual ejection port information 801 in the RAM 306 and selected in the step S1102. Then a step S1104 stores the user name (name of user in current use), the print server name etc. associated with the print job, in a memory of the ejection port information 602 to 604 corresponding to the selected ejection port. Then a step S1105 instructs the option controller 108 to move the position of the ejection bins, and the presence sequence is terminated.

In response, the option controller 108 moves the ejection bins according to the paper output, while making communication with the engine controller 107 as explained in the foregoing.

On the other hand, if the step S1101 identifies that there is no ejection port in current use, the sequence proceeds to a step S1106 for discriminating whether an empty ejection port is available, by referring to (B) paper amount of the ejection port information 602 to 604 for the apparatus discharge bins. If an empty ejection port is available, a step S1107 selects the empty ejection port, and the sequence proceeds to the step S1103 for storing the paper ejector number and the apparatus ejection port information in an area of the virtual ejection bin number selected in the step S1102.

On the other hand, if the step S1106 identifies that the empty ejection port is not available, the sequence proceeds to a step S1108 for waiting until the ejection bins is emptied by the removal of the currently retained papers, and the sequence then returns to the step S1101.

In the above-described embodiment, the sequence waits until the ejection bin is emptied in case the ejection port to be selected is absent, but the present invention is not limited to such embodiment. It is also possible, in such case, to send a notice to the address of the user whose output is completed but not yet removed, in order to request removal of the output papers. In such case, the notice is displayed by the utility software on the host computer, utilizing the SNMP provided in the LAN interface 304.

It is also possible to eliminate the ejection port in the error state, by referring to the (D) basic status of the ejection port information 602 to 604. The ejection port selection controller 310 selects the ejection port by investigating the empty state of the ejection ports, but the selection can also be made by comparing the ability of the ejection port such as (F) paper size, (G) stapling and (H) paper type in the ejection port information 602 to 604 with that described in the input print job.

Figure 12:
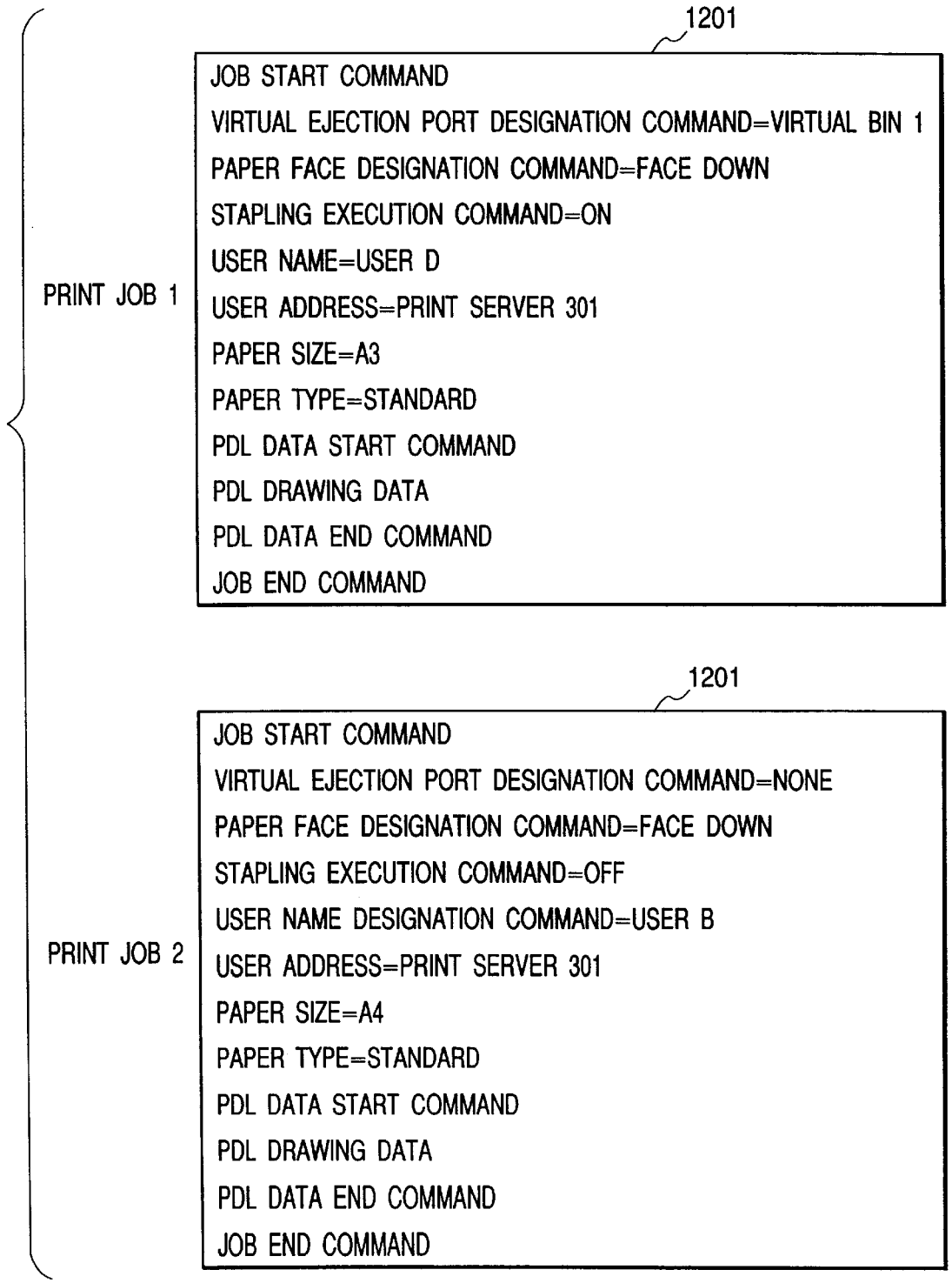
FIG. 12 is a view showing the data structure of a print job in the image output apparatus of the second embodiment of the present invention.

FIG. 12 is a view showing the format of the print job transferred from the print server 302 in the embodiments of the present invention.

Referring to FIG. 12, the print job (1) 1201, inputted in the first embodiment, is composed of a job start command defining the start of the print job, a virtual ejection port designation command selected by the user as explained in relation to FIG. 4, a stapling execution command for designating the execution of stapling, user name information and user address information for informing to the user whose output is retained as explained in relation to FIGS. 7 and 11, paper size information to be used by the print job (also used for selecting the ejection port), paper type information to be used by the print job (also used for selecting the ejection port), a PDL data start command for starting the PDL data for generating the intermediate page data by the image generation module, PDL drawing data, a PDL data end command, and a job end command indicating the end of the print job.

The print job (2) 1202, inputted in the second embodiment, is composed of a job start command defining the start of the print job, a virtual ejection port designation command selected by the user (designation is none because the selection is made by the user name), a stapling execution command for designating the execution of stapling, a user name designation command for selecting the virtual ejection port as explained in relation to FIGS. 10 and 11 (also used as user name information and address information for informing to another user whose output is retained as explained in relation to FIG. 11), paper size information to be used by the print job (also used for selecting the ejection port), paper type information to be used by the print job (also used for selecting the ejection port), a PDL data start command for starting the PDL data for generating the intermediate page data by the image generation module, PDL drawing data, a PDL data end command, and a job end command indicating the end of the print job.

Third Embodiment

Figure 13:
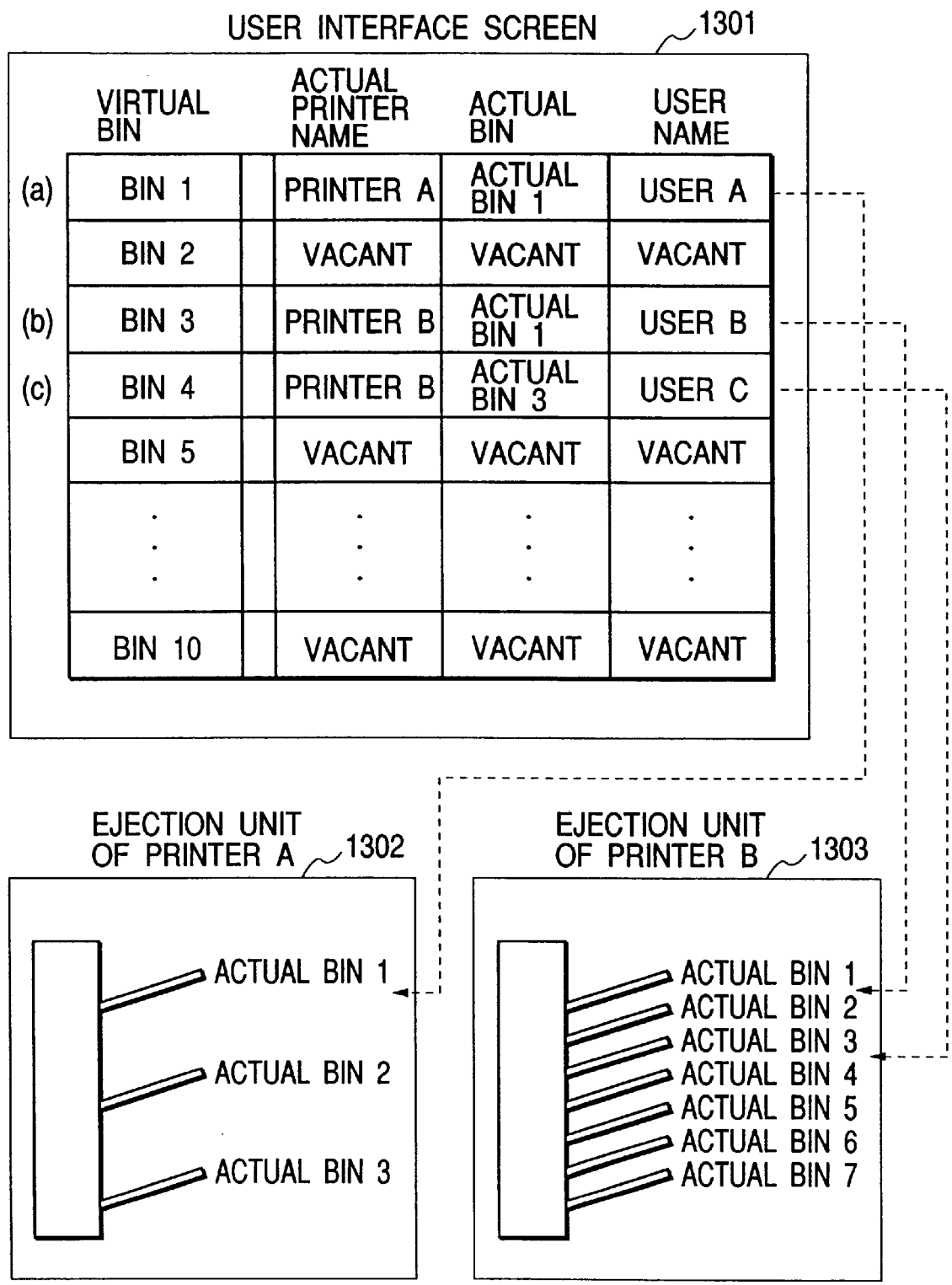
FIG. 13 is a view showing a user interface image frame of an image output system capable of integrally utilizing plural image output apparatus of a third embodiment of the present invention.
Figure 14:
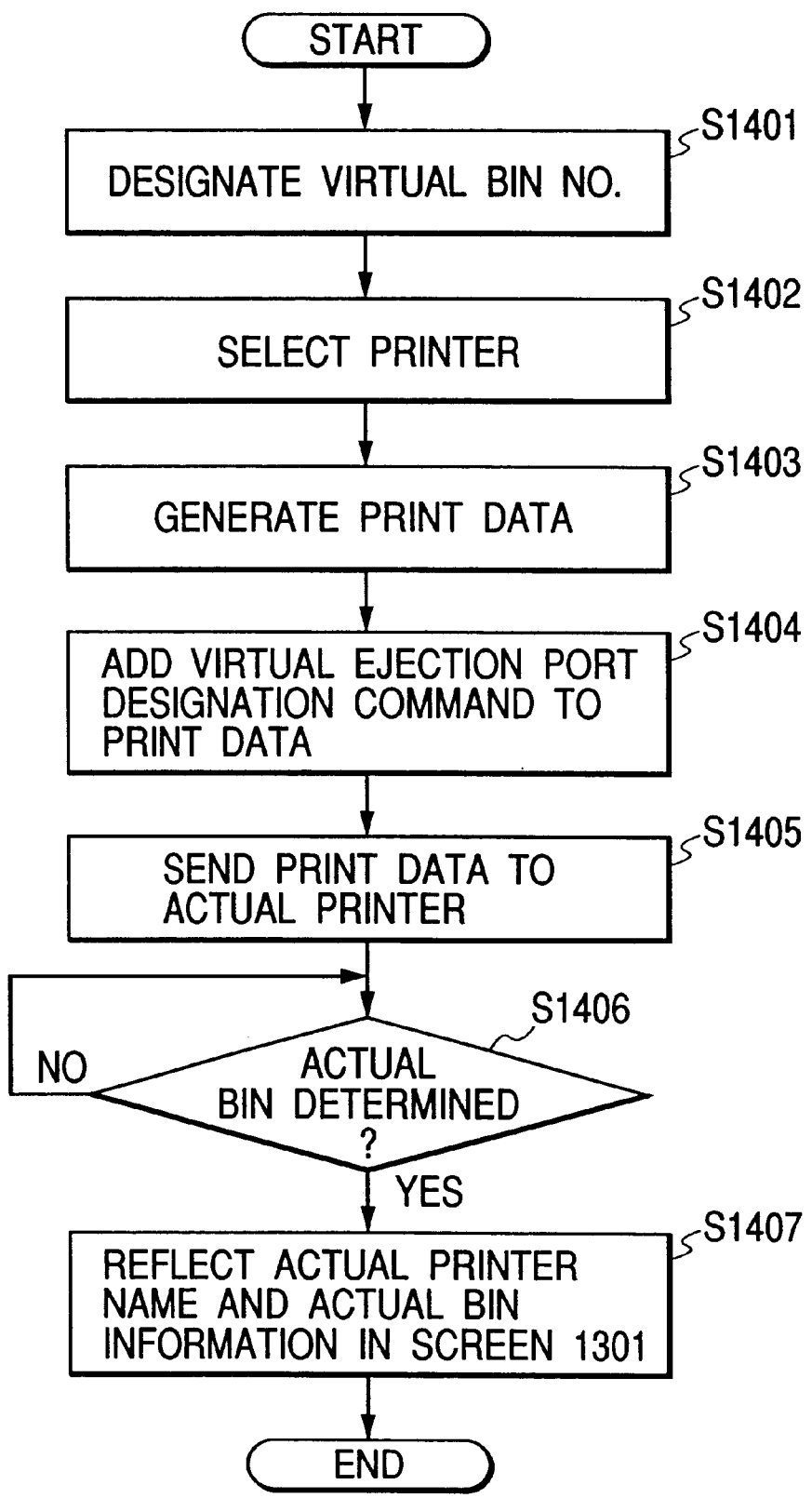
FIG. 14 is a flow chart showing the process sequence of a printer driver module on a host computer in the image output system capable of integrally utilizing plural image output apparatus of the third embodiment of the present invention.

FIGS. 13 and 14 show an image output system constituting a third embodiment of the present invention. In the present embodiment, there will be explained a case of designating the virtual ejection port by a number, but a name may also be used for this purpose.

In the following, there will be explained a print job generating operation on the host computer, a user interface image field, and a case of output to the virtual ejection port with an integral user interface with two image output apparatus. The number of the image output apparatus is not limited to two, but the image output system may have one or three or more image output apparatus.

FIG. 13 shows a user interface image field 1301 for selecting the virtual ejection bins and displaying the correspondence with the real ejection bins of the image output apparatus 100 on a host computer 300 (or 301) in the image output system of the third embodiment of the present invention.

The user prepares for example a document, utilizing a user application such as a text preparation software, and instructs printing on such application to obtain the printed output from the image output apparatus. In this operation, the printer driver software is activated as a function of the operating system on the host computer 300, and displays the user interface image 1301 shown in FIG. 13 on the host computer 300.

In the user interface image field 1301, (a), (b) and (c) display the printing state with the present image output system.

More specifically, (a) indicates that a user A is executing printing operation by selecting the virtual ejection bin 1 on the host computer 300 and that the real print is outputted to the real ejection bin 1 of the real printer A 1302.

Also (b) indicates that a user B is executing printing operation by selecting the virtual ejection bin 3 on an unrepresented host computer and that the real print is outputted to the real ejection bin 1 of the real printer B 1303.

Also (c) indicates that a user C is executing printing operation by selecting the virtual ejection bin 4 on an unrepresented host computer and that the real print is outputted to the real ejection bin 3 of the real printer B 1303.

The correlation between the virtual ejection bin and the real ejection bin is made by the method described in the first embodiment of the present invention. Also the user interface image field 1301 may also be so constructed as to display the ejection port information shown in FIG. 6, as explained in the first embodiment of the present invention.

FIG. 14 is a flow chart showing the function of the printer driver module, functioning on the operating system of the host computer in the image output system of the third embodiment of the present invention.

When the user designates a virtual ejection bin number of the user interface image field 1301 (S1401), the printer driver selects the printer to which the print data are to be transmitted (S1402). In this operation, the SNMP provided in the LAN interface card 304 may be utilized to enable immediate acquisition of the status of the image output apparatus by the printer driver, for selection of the printer for data transmission.

Then the print data for the selected printer are prepared as PDL data (S1403), and the print job is generated by the addition of the virtual ejection port selection command (S1404) and is transmitted to the selected real printer (S1405).

Utilizing the SNMP provided in the LAN interface card 304, the printer driver module acquires whether the transmitted print job is analyzed in the printer and the real ejection bin is fixed (S1406), and, if the information of the ejection port to be actually used for printing is acquired, the real printer name and the real ejection bin information are added to the user interface image 1301 (S1407).

It is assumed that such ejection port information is acquired directly, utilizing the SNMP function, but the present invention is not limited to such configuration. It is also possible that the print server 302 acquires the ejection port information shown in FIG. 6 by the SNMP function and stores such information in the print server and that the printer driver on the host computer 300 (or 301) acquires the ejection port information of each image output apparatus through the print server 302, utilizing the function of the operating system.

Fourth Embodiment

FIGS. 15 and 16 show an image output system constituting a fourth embodiment of the present invention.

In the following, there will be explained a print job generating operation on the host computer, a user interface image field, and a case of output to the virtual ejection port by the user name or output to the virtual ejection port by the user name acquired by the printer driver from the system in the host computer, with an integral user interface with two image output apparatus. The number of the image output apparatus is not limited to two, but the image output system may have one or three or more image output apparatus.

FIG. 15 shows a user interface image field 1501 for selecting the virtual ejection bins by the user name and displaying the correspondence with the real ejection bins of the image output apparatus 100 on a host computer 300 (or 301) in the image output system of the fourth embodiment of the present invention.

The user prepares for example, a document, utilizing a user application such as a text preparation software, and instructs printing on such application to obtain the printed output from the image output apparatus. In this operation, the printer driver software is activated as a function of the operating system on the host computer 300, and displays the user interface image 1501 shown in FIG. 15 on the host computer 300.

In the user interface image field 1501, the user name is same the registered user name as explained in relation to FIG. 8 in the second embodiment of the present invention.

In the user interface image field 1501, there is indicated that a user A is executing printing operation by selecting the user A which is a user name corresponding to a virtual ejection bin on the host computer 300 and that a print job of a job name JOB1 is outputted to the real ejection bin 1 of the real printer A 1302.

Also a user C is executing printing operation by selecting the user C which is a user name corresponding to a virtual ejection bin on the host computer 300 and that a print job of a job name JOB2 is outputted to the real ejection bins 3, 4 the real printer B 1303.

The correlation between the virtual ejection bin, the registered user name and the real ejection bin is made by the method described in the second embodiment of the present invention. Also the user interface image field 1501 may also be so constructed as to display the ejection port information explained in relation to FIG. 6 in the first embodiment of the present invention.

FIG. 16 is a flow chart showing the function of the printer driver module, functioning on the operating system of the host computer in the image output system of the fourth embodiment of the present invention.

When the user designates a user name registered on the virtual ejection bin on the user interface image field 1501 (S1601), the printer driver selects the printer to which the print data are to be transmitted (S1602). There may also be adopted such a configuration that the printer driver can acquire the status of the image output apparatus, utilizing the SNMP provided in the LAN interface card 304 and that a printer with an empty real ejection bin is preferentially selected for data transmission, utilizing the selection method explained in relation to FIG. 11 in the second embodiment of the present invention.

Then the print data for the selected printer are prepared as PDL data (S1603), and the print job is generated by the addition of the designated user name information and the job name as explained in FIG. 12 (S1604) and is transmitted to the selected real printer (S1605).

Utilizing the SNMP provided in the LAN interface card 304, the printer driver module acquires whether the transmitted print job is analyzed in the printer and the real ejection bin is fixed (S1606), and, if the information of the ejection port to be actually used for printing is acquired, the real printer name, the real ejection bin information and the job name are added to the user interface image field 1501 (S1607).

It is assumed that the user designates the user name on the user interface image field 1501, but there may also be adopted a configuration that the printer driver automatically acquires the name of the user executing the printing, from the system on the host computer 300, as explained in FIG. 10.

It is assumed that the printer driver directly acquires the ejection port information, utilizing the SNMP function, but the present invention is not limited to such configuration. It is also possible that the print server 302 acquires the ejection port information shown in FIG. 6 by the SNMP function and stores such information in the print server and that the printer driver on the host computer 300 (or 301) acquires the ejection port information of each image output apparatus through the print server 302, utilizing the function of the operating system.

As detailedly explained in the foregoing, the image output method and apparatus of the present invention allow plural users to automatically execute exclusive control without paying attention to the ejection ports user by other users, thereby preventing mixed presence of print jobs at an ejection port.

The image output method and apparatus of the present invention also allow to assign the ejection ports to N users, without relying on the ejection ports provided on the apparatus thereby preventing mixed presence of the print jobs.

The image output method and apparatus of the present invention also allow plural users to automatically execute exclusive control by detecting a failure in the ejection port, induced by another user, thereby enabling output without interruption in the print job and preventing deterioration of the throughput.

The image output method and apparatus of the present invention also allow to select the ejection port for the print job at the timing of output thereof to the apparatus, thereby preventing mixed ejection of the print jobs even in case the ejection ports of a limited number are used by N users.

The image output method and apparatus of the present invention also allow to realize the mailbox function for N users by automatically assigning the ejection ports of a limited number to the real users who have transferred the print jobs, thereby significantly improving the convenience for the users in the large-scale network environment, while suppressing the cost of the apparatus.

What is claimed is:

1. A method of controlling a system comprising a plurality of apparatuses including first and second apparatuses each of which is capable of performing a specific process based on a specific operating condition, said method comprising:

a selection step, of, when setting is made by a user for causing any one of the plurality of apparatuses to perform a process based on the specific operating condition, allowing the user to select either one of first and second selection candidates both presented in one integral selection candidate group, the first selection candidate being provided for, without an explicit operation of selecting the first apparatus by the user, enabling selection of an instruction for instructing the first apparatus to execute the specific process based on the specific operating condition, and the second selection candidate being provided for, without an explicit operation of selecting the second apparatus by the user, enabling selection of an instruction for instructing the second apparatus to execute the specific process based on the specific operating condition; and a control step, of controlling the first apparatus to execute the specific process based on the specific operating condition without the explicit operation of selecting the first apparatus by the user when the first selection candidate is selected from the one integral selection candidate group in said selection step, and controlling the second apparatus to execute the specific process based on the specific operating condition without the explicit operation of selecting the second apparatus by the user when the second selection candidate is selected from the one integral selection candidate group in said selection step.

2. A method according to claim 1, wherein each of the first and second apparatuses comprises an image forming apparatus provided with an image forming unit for forming an image on a sheet and with a storage unit for storing the sheet, and wherein said control step includes controlling the first apparatus to execute an image forming process with the storage unit of the first apparatus without the explicit operation of selecting the first apparatus by the user when the first selection candidate is selected from the one integral selection candidate group in said selection step, and includes controlling the second apparatus to execute an image forming process with the storage unit of the second apparatus without the explicit operation of selecting the second apparatus by the user when the second selection candidate is selected from the one integral selection candidate group in said selection step.

3. A method according to claim 2, wherein each of the first and second apparatuses is provided with a plurality of the storage units, wherein said selection step includes allowing the user to select through a selector one selection candidate from among a plurality of third selection candidates and a plurality of fourth selection candidates all presented in one integral selection candidate group, each of the plurality of third selection candidates being provided for enabling selection of an instruction for instructing the first apparatus to execute the image forming process with a different one of the storage units of the first apparatus and each of the plurality of fourth selection candidates being provided for enabling selection of an instruction for instructing the second apparatus to execute the image forming process with a different one of the storage units of the second apparatus, and wherein said control step includes controlling either one of the first and second apparatuses corresponding to the selected selection candidate to execute the image forming process with one of the storage units corresponding to the selected selection candidate.

4. A method according to claim 1, further comprising a notifying step of notifying the user of an execution result controlled in said control step.

5. A method according to claim 3, wherein each of the plurality of storage units comprises a container unit capable of containing a sheet on which an image has been formed.

6. A method according to claim 1, wherein said selection step includes allowing the user to select either one of first and second selection candidates both presented in one integral selection candidate group through a user interface window including a first display unit capable of displaying the one integral selection candidate group.

7. A method according to claim 6, wherein the user interface window is displayed on a computer.

8. A method according to claim 7, wherein the user interface window is displayed on the computer by a printer driver.

9. A method according to claim 6, wherein the user interface window includes a second display unit capable of displaying information on the apparatus capable of performing the specific process based on the specific operating condition such that the information is distinguishable for the first and second selection candidates included in the one integral selection candidate group displayed by the first display unit.

10. A method according to claim 7, wherein said control step sends a print job of the computer to either one of the first and second apparatus corresponding to the selection candidate selected through the user interface window and causes the apparatus to execute the specific process based on the specific operating condition.

11. A method according to claim 1, wherein the system includes a system in which processing is executed via a network.

12. A method according to claim 1, wherein the system includes at least three such apparatuses.

13. A method according to claim 1, wherein the system includes either one of (i) a system including one of the apparatus, (ii) a system including two of the apparatuses, and (iii) a system including at least three of the apparatuses.

14. A method according to claim 1, wherein said selection step includes allowing the user to select either one of the first and second selection candidates from the one integral selection candidate group through an operation panel of the apparatus capable of performing the specific process based on the specific operating condition.

15. A system comprising a plurality of apparatuses including first and second apparatuses each of which is capable of performing a specific process based on a specific operating condition, said system comprising:

a selector, arranged for, when setting is made by a user for causing any one of the plurality of apparatuses to perform a process based on the specific operating condition, allowing the user to select either one of first and second selection candidates both presented in one integral selection candidate group, the first selection candidate being provided for, without an explicit operation of selecting the first apparatus by the user, enabling selection of an instruction for instructing the fist apparatus to execute the specific process based on the specific operating condition, and the second selection candidate being provided for, without an explicit operation of selecting the second apparatus by the user, enabling selection of an instruction to instructing the second apparatus to execute the specific process based on the specific operating condition; and a controller, arranged for controlling the first apparatus to execute the specific process based on the specific operating condition without the explicit operation of selecting the first apparatus by the user when the first selection candidate is selected from the one integral selection candidate group by said selector, and controlling the second apparatus to execute the specific process based on the specific operating condition without the explicit operation of selecting the second apparatus by the user when the second selection candidate is selected from the one integral selection candidate group by said selector.

* * * * *

UNITED STATES PATENT AND TRADEMARK OFFICE
CERTIFICATE OF CORRECTION

PATENT NO. : 6,714,313 B1
DATED : March 30, 2004
INVENTOR(S) : Akio Sugaya

It is certified that error appears in the above-identified patent and that said Letters Patent is hereby corrected as shown below:

<u>Title page,</u>
Item [30], Foreign Application Priority Data, "Feb. 16, 1999 (JP) …. 10-048596" should read -- Feb. 16, 1998 (JP) …. 10-048595 --.

<u>Column 2,</u>
Line 48, "user" should read -- users --.

<u>Column 3,</u>
Line 3, "relaying" should read -- relying --.

<u>Column 9,</u>
Line 7, "moving" should read -- moves --.

<u>Column 11,</u>
Line 50, "in-advance" should read -- in advance --.
Line 52, "of" should read -- is --.

<u>Column 14,</u>
Line 14, "presence" should read -- present --.

<u>Column 15,</u>
Line 12, "or" should read -- for --.

<u>Column 17,</u>
Line 42, "presence" should read -- present --.
Line 61, "bins" should read -- bin --.

<u>Column 20,</u>
Line 26, "same the" should read -- the same --.
Line 38, "the" should read -- of the --.

<u>Column 21,</u>
Line 25, "user" should read -- used --.

<u>Column 23,</u>
Line 22, "apparatus," should read -- apparatuses, --.

UNITED STATES PATENT AND TRADEMARK OFFICE
CERTIFICATE OF CORRECTION

PATENT NO. : 6,714,313 B1
DATED : March 30, 2004
INVENTOR(S) : Akio Sugaya

It is certified that error appears in the above-identified patent and that said Letters Patent is hereby corrected as shown below:

Column 24,
Line 9, "fist" should read -- first --.
Line 15, "to" should read -- for --.

Signed and Sealed this

Fourteenth Day of September, 2004

JON W. DUDAS
*Director of the United States Patent and Trademark Office*